US011244189B2

(12) United States Patent
Fathi et al.

(10) Patent No.: US 11,244,189 B2
(45) Date of Patent: *Feb. 8, 2022

(54) SYSTEMS AND METHODS FOR EXTRACTING INFORMATION ABOUT OBJECTS FROM SCENE INFORMATION

(71) Applicant: Pointivo, Inc., Atlanta, GA (US)

(72) Inventors: Habib Fathi, Atlanta, GA (US); Miguel M. Serrano, Marietta, GA (US); Bradden John Gross, Atlanta, GA (US); Daniel L. Ciprari, Atlanta, GA (US)

(73) Assignee: POINTIVO, INC., Atlanta, GA (US)

( * ) Notice: Subject to any disclaimer, the term of this patent is extended or adjusted under 35 U.S.C. 154(b) by 24 days.

This patent is subject to a terminal disclaimer.

(21) Appl. No.: 16/818,814

(22) Filed: Mar. 13, 2020

(65) Prior Publication Data
US 2020/0320327 A1 Oct. 8, 2020

Related U.S. Application Data

(63) Continuation of application No. 15/875,149, filed on Jan. 19, 2018, now Pat. No. 10,592,765, which is a
(Continued)

(51) Int. Cl.
*G06K 9/34* (2006.01)
*G06T 7/55* (2017.01)
(Continued)

(52) U.S. Cl.
CPC ......... *G06K 9/342* (2013.01); *G06K 9/00201* (2013.01); *G06K 9/00208* (2013.01);
(Continued)

(58) Field of Classification Search
CPC .............. G06K 9/342; G06K 9/00201; G06K 9/00208; G06K 9/00664; G06K 9/6218;
(Continued)

(56) References Cited

U.S. PATENT DOCUMENTS 6,038,337 A 3/2000 Lawrence et al.
6,754,379 B2 * 6/2004 Xiong ...................... G06K 9/32
345/629
(Continued)

FOREIGN PATENT DOCUMENTS

EP 2 993 623 3/2016

OTHER PUBLICATIONS

Lee et al., 2002, "Automatic Integration of Façade Textures into 3D Building Models with a Projective Geometry Based Line Clustering", (pp. 511-519); (Year: 2002).*
(Continued)

*Primary Examiner* — Manav Seth
(74) *Attorney, Agent, or Firm* — Thomas | Horstemeyer, LLP

(57) ABSTRACT

Examples of various method and systems are provided for information extraction from scene information. 2D image information can be generated from 2D images of the scene that are overlapping at least part of one or more object(s). The 2D image information can be combined with 3D information about the scene incorporating at least part of the object(s) to generate projective geometry information. Clustered 3D information associated with the object(s) can be generated by partitioning and grouping 3D data points present in the 3D information. The clustered 3D information can be used to provide, e.g., measurement information, dimensions, geometric information, and/or topological information about the object(s). Segmented 2D information can also be generated from the 2D image information. Validated 2D and 3D information can be produced by cross-referencing between the projective geometry information, clustered 3D information, and/or segmented 2D image information, and used to label the object(s) in the scene.

20 Claims, 4 Drawing Sheets

Related U.S. Application Data continuation of application No. 15/418,741, filed on Jan. 29, 2017, now Pat. No. 9,904,867.

(60) Provisional application No. 62/288,520, filed on Jan. 29, 2016, provisional application No. 62/451,700, filed on Jan. 28, 2017.

(51) Int. Cl.
*G06K 9/00* (2006.01)
*G06K 9/62* (2006.01)
*G06T 17/00* (2006.01)

(52) U.S. Cl.
CPC ....... *G06K 9/00664* (2013.01); *G06K 9/6218* (2013.01); *G06T 7/55* (2017.01); *G06T 17/00* (2013.01); *G06K 2209/40* (2013.01); *G06T 2207/10028* (2013.01)

(58) Field of Classification Search
CPC ....... G06K 2209/40; G06T 7/55; G06T 17/00; G06T 2207/10028
See application file for complete search history.

(56) References Cited

U.S. PATENT DOCUMENTS

| | | | |
|---|---|---|---|
| 6,795,090 B2* | 9/2004 | Cahill | G06T 15/205 345/427 |
| 7,003,136 B1 | 2/2006 | Harville | |
| 7,043,474 B2 | 5/2006 | Mojsilovic et al. | |
| 7,099,510 B2 | 8/2006 | Jones et al. | |
| 7,123,779 B2* | 10/2006 | Beuker | A61B 6/5241 382/294 |
| 7,174,033 B2 | 2/2007 | Yukhin et al. | |
| 7,203,669 B2 | 4/2007 | Lienhart et al. | |
| 7,257,236 B2 | 8/2007 | Yukhin et al. | |
| 7,426,292 B2* | 9/2008 | Moghaddam | G06T 17/00 345/419 |
| 7,478,091 B2 | 1/2009 | Mojsilovic et al. | |
| 7,542,610 B2 | 6/2009 | Gokturk et al. | |
| 7,643,025 B2* | 1/2010 | Lange | G06T 17/20 345/419 |
| 7,657,100 B2 | 2/2010 | Gokturk et al. | |
| 7,680,323 B1 | 3/2010 | Nichani | |
| 8,131,113 B1* | 3/2012 | Jin | G06T 7/74 382/284 |
| 8,165,407 B1 | 4/2012 | Khosla et al. | |
| 8,254,699 B1 | 8/2012 | Zhao et al. | |
| 8,340,453 B1* | 12/2012 | Chen | H04N 5/2353 382/254 |
| 8,427,473 B2 | 4/2013 | Elsberg et al. | |
| 8,565,536 B2 | 10/2013 | Liu | |
| 8,649,565 B1 | 2/2014 | Kim et al. | |
| 8,670,961 B2* | 3/2014 | Pershing | G06Q 30/02 703/2 |
| 8,705,849 B2 | 4/2014 | Prokhorov | |
| 8,781,217 B2 | 7/2014 | Gurman et al. | |
| 8,811,727 B2 | 8/2014 | Mohamed | |
| 8,830,229 B2 | 9/2014 | Drost et al. | |
| 8,861,785 B2* | 10/2014 | Oi | G06T 7/73 382/103 |
| 8,874,557 B2 | 10/2014 | Lin et al. | |
| 8,897,539 B2 | 11/2014 | Stone et al. | |
| 8,913,058 B2 | 12/2014 | Liu | |
| 8,942,468 B1 | 1/2015 | Toshev et al. | |
| 8,983,201 B2 | 3/2015 | Cai et al. | |
| 9,002,719 B2 | 4/2015 | Tofte | |
| 9,008,356 B1 | 4/2015 | Toshev et al. | |
| 9,026,303 B1 | 5/2015 | Ferguson et al. | |
| 9,070,018 B1* | 6/2015 | Ciarcia | G06K 9/00624 |
| 9,076,065 B1 | 7/2015 | Vijayanarasimhan | |
| 9,087,232 B2 | 7/2015 | Solem et al. | |
| 9,087,297 B1 | 7/2015 | Filippova et al. | |
| 9,098,655 B2 | 8/2015 | Plummer et al. | |
| 9,129,376 B2 | 9/2015 | Pershing | |
| 9,142,012 B2 | 9/2015 | Lim et al. | |
| 9,171,018 B2 | 10/2015 | Ovsjanikov et al. | |
| 9,196,084 B2 | 11/2015 | Boardman et al. | |
| 9,199,641 B2 | 12/2015 | Ferguson et al. | |
| 9,224,046 B2 | 12/2015 | Feris et al. | |
| 9,224,068 B1 | 12/2015 | Ranzato | |
| 9,251,301 B2 | 2/2016 | Wood | |
| 9,256,807 B1 | 2/2016 | Shlens et al. | |
| 9,262,693 B2 | 2/2016 | Kamiya | |
| 9,269,017 B2 | 2/2016 | Lin et al. | |
| 9,269,022 B2 | 2/2016 | Rhoads et al. | |
| 9,275,308 B2 | 3/2016 | Szegedy et al. | |
| 9,298,984 B2 | 3/2016 | Tsukamoto et al. | |
| 9,317,676 B2 | 4/2016 | Liu et al. | |
| 9,349,076 B1 | 5/2016 | Liu et al. | |
| 9,367,921 B2 | 6/2016 | Boardman et al. | |
| 9,373,057 B1 | 6/2016 | Erhan et al. | |
| 9,383,445 B2 | 7/2016 | Lu et al. | |
| 9,424,493 B2 | 8/2016 | He et al. | |
| 9,443,314 B1 | 9/2016 | Huang et al. | |
| 9,460,517 B2 | 10/2016 | Fathi et al. | |
| 9,471,828 B2 | 10/2016 | Shen et al. | |
| 9,904,867 B2* | 2/2018 | Fathi | G06K 9/00201 |
| 10,127,722 B2 | 11/2018 | Shakib | |
| 10,592,765 B2* | 3/2020 | Fathi | G06K 9/00201 |
| 10,776,533 B2* | 9/2020 | Fisker | A61C 13/0004 |
| 2003/0091227 A1 | 5/2003 | Chang et al. | |
| 2007/0263924 A1 | 11/2007 | Kochi et al. | |
| 2009/0232388 A1 | 9/2009 | Minear et al. | |
| 2010/0166339 A1 | 7/2010 | Gokturk et al. | |
| 2010/0204964 A1 | 8/2010 | Pack et al. | |
| 2011/0137753 A1 | 6/2011 | Moehrle et al. | |
| 2011/0182477 A1 | 7/2011 | Tamrakar et al. | |
| 2011/0187713 A1* | 8/2011 | Pershing | G06T 19/20 345/420 |
| 2011/0194777 A1 | 8/2011 | Gokturk et al. | |
| 2011/0243450 A1 | 10/2011 | Liu | |
| 2012/0148162 A1 | 6/2012 | Zhang et al. | |
| 2012/0269384 A1 | 10/2012 | Jones et al. | |
| 2013/0083990 A1 | 4/2013 | Stone et al. | |
| 2013/0085588 A1 | 4/2013 | Brun et al. | |
| 2013/0096873 A1 | 4/2013 | Rosengaus et al. | |
| 2013/0155058 A1 | 6/2013 | Golparvar-Fard et al. | |
| 2013/0331145 A1 | 12/2013 | Liao et al. | |
| 2014/0133698 A1 | 5/2014 | Fernandez et al. | |
| 2014/0152651 A1 | 6/2014 | Chen et al. | |
| 2014/0192050 A1 | 7/2014 | Qiu et al. | |
| 2014/0270480 A1 | 9/2014 | Boardman et al. | |
| 2014/0363048 A1 | 12/2014 | Vrcelj et al. | |
| 2015/0022640 A1 | 1/2015 | Metzler et al. | |
| 2015/0109415 A1 | 4/2015 | Son et al. | |
| 2015/0161170 A1 | 6/2015 | Yee et al. | |
| 2015/0178383 A1* | 6/2015 | Corrado | G06F 16/50 707/740 |
| 2016/0239976 A1 | 8/2016 | Fathi et al. | |
| 2018/0247416 A1* | 8/2018 | Ruda | G06T 7/0004 |

OTHER PUBLICATIONS

Lee et al, 2003, "Interactive 3D Building Modeling Using a Hierarchical Representation", (pp. 1-8) (Year: 2003).*

Mani Golparvar-Fard et al., "Integrated Sequential As-Built and As-Planned Representation with DAR Tools in support of Decision-Making Tasks in the AEC/FM Industry" (pp. 1099-1116) (Year: 2011).*

Office Action for application No. 17 745 060.8-1207 dated Feb. 24, 2021.

Nguyen, et al., Interactive objection segmentation from multi-view images, Mar. 5, 2013, XP028583282.

Xiao, et aol, "Joint Affinity Propagation for Multiple View Segmentation", ICCV 2007, IEEE 11th International Conference on Computer Vision.

Supplementary EP Search Report for EP 17 74 5060, dated Jul. 29, 2019.

Unnikrishnan, Ranjith, and Martial, Hebert. "Robust extraction of multiple structures from non-uniformly sampled data." Proceedings

(56) References Cited

OTHER PUBLICATIONS of 2003 IEEE/RSJ International Conference on Intelligent Robots and Systems (IROS 2003). vol. 2. Oct. 2003.
Golovinskiy, Aleksey, and Thomas Funkhouser. "Min-cut based segmentation of point clouds," 2009 IEEE 12th International Conference on Computer Vision Workshops (ICCV Workshops). Sep. 2009.
Rabbani, Tahir, Frank Van Den Heuvel, and George Vosselmann. "Segmentation of point clouds using smoothness constraint." International Archives of Photogrammetry, Remote Sensing and Spatial Information Sciences, 36.5, pp. 248-253. Jan. 2006.
Vosselman, George and Dijkman, Sander. "3D building model reconstruction from point clouds and ground plans." International Archives of Photogrammetry and Remote Sensing, vol. XXXIV-3/W4. Oct. 2001. (https://www.researchgate.net/publication/228610502_3D_building_model_reconstruction_from_point_clouds_and_ground_plans).
"Euclidean Cluster Extraction" (http://www.pointclouds.org/documentation/tutorials/cluster_extraction.php) Dec. 19, 2015.
Szegedy et al., "Deep neural networks for object detection." Advances in Neural Information Processing Systems. (Dec. 2013).
Amit et al., "Object Detection" https://cs.brown.edu/~pff/papers/detection.pdf, (Aug. 2015).
Erhan et al., "Scalable object detection using deep neural networks." Proceedings of the IEEE Conference on Computer Vision and Pattern Recognition. (Jun. 2014).
Turkan et al., "Automated progress tracking using 4D schedule and 3D sensing technologies." Automation in Construction 22 (Mar. 2012): 414-421.
Eastman et al., BIM handbook: A guide to building information modeling for owners, managers, designers, engineers and contractors. John Wiley & Sons, (Apr. 2011).
Bernd Heisele, Visual Object Recognition with Supervised Learning, Visual Object Recognition with Supervised Learning, IEEE Intelligent Systems, (vol. 18, Issue: 3, May-Jun. 2003).
Kropp et al., "Drywall state detection in image data for automatic indoor progress monitoring." Computing in Civil and Building Engineering, 347-354 (Jun. 2014).
Pandey et al., "Scene recognition and weakly supervised object localization with deformable part-based models." Computer Vision (ICCV), 2011 IEEE International Conference on. IEEE (Nov. 2011).
Bosche et al., "Tracking the built status of MEP works: Assessing the value of a Scan-vs-BIM system." Journal of Computing in Civil Engineering 28.4 (Jul. 2013): 05014004.
Cinbis et al., "Multi-fold mil training for weakly supervised object localization." Proceedings of the IEEE Conference on Computer Vision and Pattern Recognition. (Jun. 2014).
Rosenberg et al. "Semi-supervised self-training of object detection models." Seventh IEEE Workshop on Applications of Computer Vision (Jan. 2005).
Belsky et al., "A framework for semantic enrichment of IFC building models." Proceedings of 30th International Conference on Applications of IT in the AEC Industry CIB-W78. (Oct. 2013).
Pavel et al., "Recurrent convolutional neural networks for object-class segmentation of RGB-D video." Neural Networks (IJCNN), 2015 International Joint Conference on IEEE, (Jul. 2015).
International application No. PCT/US17/15527, filed Jan. 29, 2017, Notification of Transmittal of the International Search Report of the Written Opinion of the International Searching Authority, or the Declaration dated Apr. 20, 2017.

\* cited by examiner

SYSTEMS AND METHODS FOR EXTRACTING INFORMATION ABOUT OBJECTS FROM SCENE INFORMATION

CROSS REFERENCE TO RELATED APPLICATIONS

This application is a continuation of U.S. patent application Ser. No. 15/875,149, filed on Jan. 19, 2018, which is a continuation of U.S. patent application Ser. No. 15/418,741, filed on Jan. 29, 2017, which claims priority to U.S. Provisional Application No. 62/288,520, filed on Jan. 29, 2016, and claims priority to U.S. Provisional Application No. 62/451,700, filed on Jan. 28, 2017. The disclosures of U.S. patent application Ser. No. 15/875,149, U.S. patent application Ser. No. 15/418,741, U.S. Provisional Application No. 62/288,520 and U.S. Provisional Application No. 62/451, 700 are all hereby incorporated by reference in their entireties.

STATEMENT REGARDING FEDERALLY SPONSORED RESEARCH OR DEVELOPMENT

This invention was made with government support under agreement 1519971 awarded by the National Science Foundation. The Government has certain rights to the invention.

FIELD OF THE INVENTION

The present disclosure provides systems and methods for extracting information about one or more objects from scene information. The information can be derived from 3D information and/or 2D images of a scene, where the 2D/3D information includes the objects. Such extracted information can include instance detection, counts, labels, geometry, measurements, topology and semantic information relating to one or more objects of interest that are present in the scene. The present invention also relates to libraries of object information, and methods of using the same.

BACKGROUND OF THE INVENTION

Object recognition is a subset of computer vision technologies, whereby, via a computer, information is extracted to detect and identify the object(s) that are present in a scene and provide useful information about such objects. It follows that a primary problem to be solved is the determination of whether the scene information contains some specific object, feature, or element of interest. In contrast to computer-based methods, humans are very efficient at such object recognition, even when the object(s) of interest are present in the scene in different visual characterizations, such as varied viewpoint, size/scale, object translation or rotation, or even where the target object is partially obstructed or obscured in a given image.

Some types of computer-based object recognition can provide generally satisfactory results today: for well-known/well-characterized objects—for example, the Eiffel Tower or storefronts in an urban area, object recognition is less challenging because such objects have been imaged and characterized broadly such that knowledge about the object and its location is largely indexed so as to be retrievable for use. For arbitrary objects that might be present in a scene, however, conventional computer-based methods for dealing with object recognition can, at best, solve only for specific target objects, such as simple geometric objects (e.g., polyhedra), the presence or absence of human faces, or printed or handwritten characters, or in situations when the images are generated so as to substantially standardize the appearance of the object(s) in the image, such as by generating the image having well-defined illumination, background, and object pose, or object position and orientation of the target object relative to the camera.

To provide identifications and other information for one or more objects of interest that may be fully or partially present in scenes substantially without human intervention where the objects may be arbitrary, current object recognition techniques typically use both positive and negative training applied by machine learning algorithms to extract object information, such as labels or other identifying properties, after suitable processing of image data from a scene. In recent years, there have been improvements in such machine learning algorithms, however, limitations in the quality of arbitrary image recognition remains. In other words, instances in which an object, although associated with a predefined class, may not appear to be identifiable by the given method. This can be a common occurrence when the very appearance of the object deviates from the canonical appearance of the class from a particular pose, vantage point, or has uncommon characteristics.

The quality of the object recognition-related and other object-specific information outputs provided resulting from determinations made by the machine learning algorithms can be greatly influenced by the quality of the image data itself. For example, detecting and distinguishing objects in image data acquired from views of uncontrolled environments (urban streets, etc.) can be challenging due to inconsistent, poor or variable scene illumination conditions, features that change (e.g., sunlight, shadows, reflections, rain, snow, night-time street illumination, etc.), or the perspective the object is seen from. The image data incorporating the object(s) of interest may also be acquired from low resolution cameras, thus providing less processable image information. Additionally, with images acquired from cameras that move among and around the scene, objects may partially occlude each other as they move through the scene relative to a camera viewpoint, particularly in situations of high density. Images acquired may also be crowded with multiple objects that are not of interest and/or be cluttered with distracting visual information, include fast moving objects, or have variable object lighting and images resolutions within a common scene. If the image data provided for processing does not incorporate the necessary quantity and quality of processable information about the actual object(s) of interest, it is less likely that the object(s) will be accurately identified, even when using the most sophisticated machine learning algorithms. Accordingly, it would be beneficial to provide enhancements to image data that is input into machine learning algorithms that are used in object identification tasks.

Alternatively, incorporating non-ideal representations of a class can aid in being able to account for such commonly occurring issues. By constructing the aforementioned dataset with both ideal and non-ideal representations for the given classes, the machine learning algorithms would be able to model for such conditions. This involves but is not limited to the inclusion of instances of the classes with noises, obstructions, variations in the object appearance by style or other characteristics, blur, variations in illuminations, etc.

Recently, it has become possible to extract accurate measurements of an object of interest directly from point clouds derived from images of scenes. An example of such methodology using a single passive imaging device is described in U.S. Pat. No. 9,460,517, (the "'517 patent"), the disclosure of which is hereby incorporated by reference in its entirety. Accurate measurements can also be generated from point clouds derived from stereoscopic images. However, again, the quality of the data—in this case, the accuracy of the measurements and other dimensional information about the object—will be affected by the form and content of the information from which the object measurements are to be derived.

Currently, object information for use in libraries is generated from 2D image information. Object recognition techniques continue to improve, which results in attendant improvements in the object libraries, as well as in the results obtained when using machine learning algorithms along with such object libraries. However, object information generated from 2D information generally lacks measurement, dimension, and topological context that can add to the ability to accurately identify and label objects in scenes. For example, a window might be recognized in a scene as being a "window," but existing object recognition techniques based primarily on 2D object identification may not be able to discern the size of the window, the amount of other windows in the scene, or the placement of the window relative to other objects in the scene, or to the scene itself. The absence of such mathematical context can reduce the accuracy of predictions about the object(s) in the scene, as well as the overall accuracy of the object libraries themselves.

In view of the above, there remains a need for improvements in the form and content of scene and object information used in object recognition techniques for use in object recognition as applied to objects present in a scene. Yet further, there remains a need for improvements in scene data that can be used to generate measurements of objects present in a scene from images or other sources of processable information about the object in the scene. There also remains a need for improved object recognition techniques whereby mathematical context about the objects in the scene can be incorporated into the object recognition results. The present disclosure provides this, and other, benefits.

SUMMARY OF THE INVENTION

Aspects of the present disclosure are related to extraction of information about objects from scene information. 2D image information can be generated from 2D images of the scene that are overlapping at least part of one or more object(s). Projective geometry information can be generated from the 2D image information and/or 3D information about the scene incorporating at least part of the object(s). The 2D image information can be combined with the 3D to generate the projective geometry information. Clustered 3D information associated with the object(s) can be generated by partitioning and grouping 3D data points present in the 3D information. The clustered 3D information can be used to provide, e.g., measurement information, dimensions, geometric information, and/or topological information about the object(s). Segmented 2D information can also be generated from the 2D image information. Validated 2D and 3D information can be produced by cross-referencing between the projective geometry information, clustered 3D information, and/or segmented 2D image information, and used to label the object(s) in the scene.

In one embodiment, among others, a method of generating information about one or more objects of interest in a scene comprises generating 2D image information from the plurality of overlapping 2D images of a scene. At least some of the plurality of overlapping 2D images can include all or part of the selected object and can be overlapping as to all or part of the selected object, thereby providing 2D image information incorporating all or part of a selected object. A plurality of overlapping 2D images of the scene, where the scene can include one or more objects and the plurality of overlapping 2D images can be derived from one or more single passive image capture devices, and an object from the scene can be selected by a computer or a user, thereby providing the selected object of interest. The method can comprise providing, by a computer, 3D information generated from the scene. The 3D information from the scene can incorporate information about all or part of the selected object, thereby providing 3D information that incorporates all or part the selected object.

In one or more aspects of these embodiments, the method comprises generating projective geometry information by combining at least some of the 2D image information incorporating all or part of the selected object and at least some of the 3D information incorporating all or part of the selected object, thereby establishing a plurality of relationships between 3D data points derived from either or both of the 2D image information incorporating all or part of the selected object and the 3D image information incorporating all or part of the selected object. The method can comprise performing a clustering step on the 3D information incorporating all or part of the selected object to partition and group 3D data points present in the 3D information, thereby generating a plurality of clustered 3D information associated with all or part of the selected object. The 3D data points can be associated with all or part of the selected object. One or more of measurement information, dimensions, and geometric information can be derivable for all or part of the selected object.

In one or more aspects of these embodiments, the at least two selected objects of interest from the scene can be provided, thereby allowing topology information to be derivable for the at least two selected objects. The topology information can define relationships between all or part of each of the at least two selected objects in a 3D space associated with the at least two selected objects. The topology information can be generated for at least part of the at least two selected objects. Each of the at least two selected objects can, independently, comprise one or more points from which a value for a distance between each of the at least two selected objects can be generated; each distance between the one or more points on the at least two selected objects can, independently, have an actual distance value; a distance value for the distance between at least one of the points on each of the at least two selected objects can, independently, be derived; and each derived distance value can, independently, be within about 5% or less of the actual distance value between corresponding points on each of the at least two selected objects.

Additional advantages of the invention will be set forth in part in the description that follows, and in part will be apparent from the description, or may be learned by practice of the invention. The advantages of the invention will be realized and attained by means of the elements and combination particularly pointed out in the appended claims. It is to be understood that both the foregoing general description and the following detailed description are exemplary and explanatory only and are not restrictive of the invention, as claimed. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

DETAILED DESCRIPTION OF THE INVENTION

Figure 1:
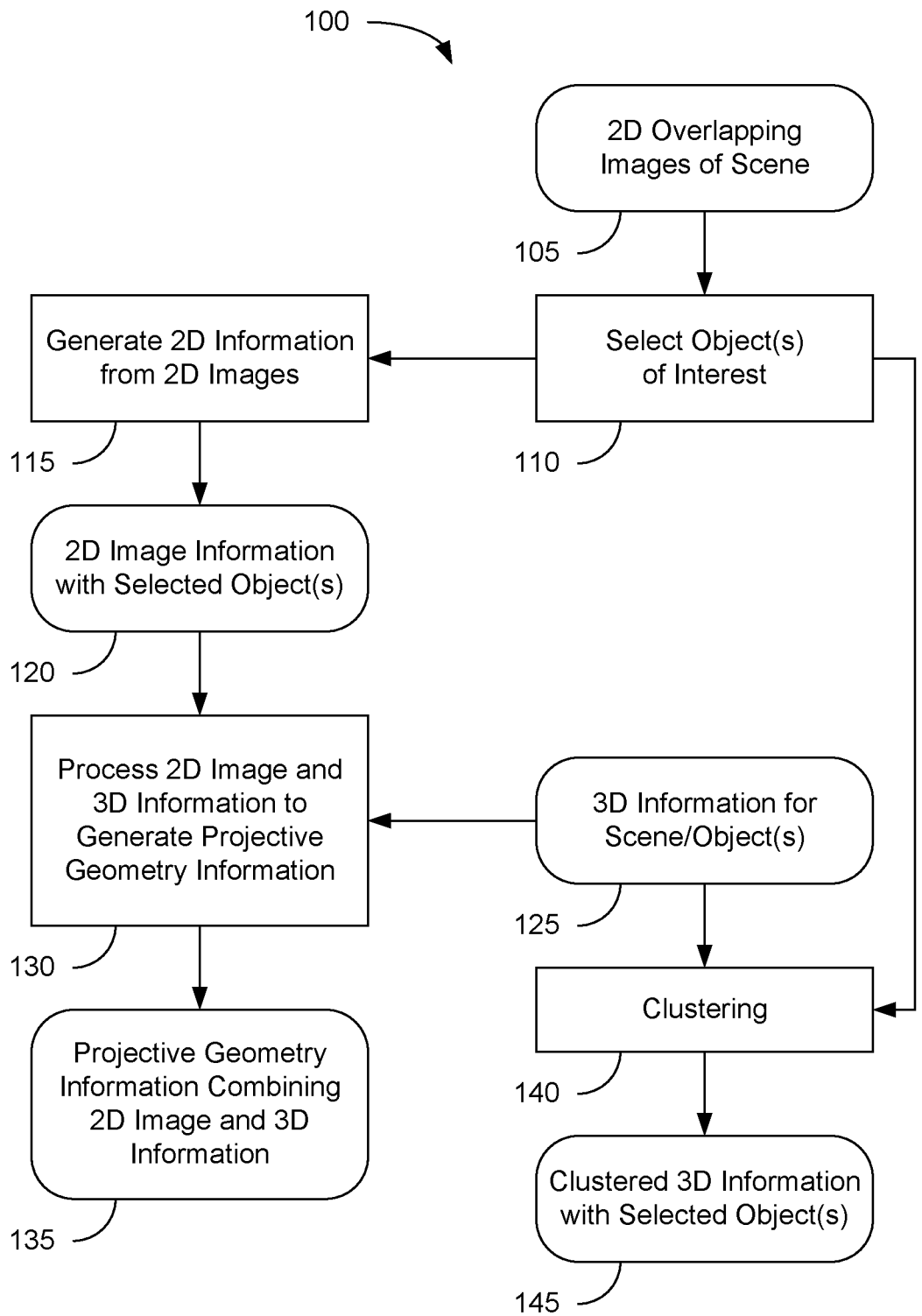
FIGS. 1 and 2A-2B are flowcharts illustrating examples of the information extraction methodology disclosed herein.

Many aspects of the disclosure can be better understood with reference to the Figures presented herewith. The Figures are intended to illustrate the various features of the present disclosure. Moreover, like references in the drawings designate corresponding parts among the several views. While several implementations may be described in connection with the included drawings, there is no intent to limit the disclosure to the implementations disclosed herein. To the contrary, the intent is to cover all alternatives, modifications, and equivalents.

The term "substantially" is meant to permit deviations from the descriptive term that do not negatively impact the intended purpose. All descriptive terms used herein are implicitly understood to be modified by the word "substantially," even if the descriptive term is not explicitly modified by the word "substantially."

The term "about" is meant to account for variations due to experimental error. All measurements or numbers are implicitly understood to be modified by the word about, even if the measurement or number is not explicitly modified by the word about.

As used herein, a "scene" is a location that can incorporate one or more objects, one or more of which may be of interest such that the object(s) of interest therein can be provided for recognition, measurement, labeling, etc. For example, a scene can include one or more buildings, as well as roads, landscape elements, vehicles, etc. In another non-limiting example, a scene can comprise a one or more objects located in the interior of a building, where the one or more objects can comprise walls, floors, mechanical equipment, windows, doors, doorways, furniture, fixtures, computers and related equipment, etc., all of which or one of which can comprise the "one or more objects of interest" in accordance with the disclosure herein.

As indicated above, an "object of interest" can encompass a wide variety of objects that may be present in a scene such as, for example, components of a building (e.g., doors, windows, walls, roofing, stairs, plumbing/piping, electrical equipment, flooring material, decorative aspects), landscape components (e.g., trees, shrubs, driveways, water features), vehicles, people, animals and the like. Indeed, an "object of interest" can be anything from which information suitable for processing to provide information about such object(s) can be derived from a scene. Further, the methodology herein can be utilized to extract information about more than one object of interest in a scene, such as a collection of smaller objects (e.g., doors, windows, etc.) associated with a larger object (e.g., the overall dimensions of a building) where information about such collection of smaller and larger objects can be processed and, in some aspects, the one or more objects can be identified from the scene. Further, the "one or more objects of interest" can include a collection of one or more smaller objects (e.g., doors, windows, etc.) associated with a larger object (e.g., a building).

As used herein, the phrases "one or more objects," "object of interest," "object(s) of interest" and "objects" can be used interchangeably, and it is to be understood that, in some instances, one object of interest may be present or partially present in a scene, and in others, there may be more than one object of interest in the scene. Partially" ("or at least part of") in reference to the one or more objects of interest refers to an instance where only a portion or portions but not the whole of an object is visible in the scene. In some aspects, the present methodology can be utilized to generate information about single or multiple objects of interest that may be present or partially present in a scene, as desired by a user. An example of partial presence of an object in a scene can include instances where the object is only partially captured due to occlusion or the perspective of the capture device or where parts of the object fit into the scene but the entirety of the object does not.

"Object detection" is the identification of an arbitrary object without expressly making a determination of what that object is. An example of this is the identification of the separate objects within a scene. Machine learning algorithms can then be applied to each separate instance of that detected object to make the most likely association or derive the desired information.

To this end, "object recognition" is a process for identifying a specific object in a digital image, point cloud, depth image, video or any captured representation. Machine learning algorithms used in object recognition generally rely on matching, learning, or pattern recognition techniques applied on the detected objects using either or both of appearance-based or feature-based techniques.

The terms "recognize", or "recognition," or variants thereof, in the context of processable 2D and 3D information, where such processable information is derived in whole or in part from scene information in which one or more objects of interest are present, means that a determination is made as to what the processable combined 2D attributes or features and/or 3D attributes or features correlates to, represents, is identified as, means, and/or has context about. These terms can pertain to objects in the 2D space such as images, the 3D space such as point clouds or wireframes, or both the 2D and 3D space for the same scene.

The terms "object library," "objects library," or "library of objects," or variants thereof means the collection of objects which the machine learning algorithms are able to predict. These objects can include any and all objects for which one or more machine learning algorithms have been trained to recognize or to differentiate. This includes subsets of sets of objects down to any level of detail. For example, a window may also be classified as a "bay window" or "a bay window on the front of a house" or an "Anderson® Double-Hung Bay Window—30 Degrees," etc.

The terms "object catalogue," "objects catalogue," or "catalogue of objects" or variants thereof means the collection of objects for which additional semantic information exists. These objects may or may not include objects found in the aforementioned object library. The semantic information may include any number of additional information items that may be useful for identification, classification, or relevant to a business need.

An object recognized from 2D and 3D processable information can, in one aspect, generate information about the instance of that object in a scene, where such instance information can be used to generate counts of the object(s), list of available objects, functionality, mutual relations, context of a scene, or other similar information. For example, the object recognition methodology according to the disclosure herein can provide information that there are 1, 2, 3, etc. of an object that comprises similar features. Such counted object may or may not be associated with objects already defined and their geometry, topology, labels, etc.

"Labeling" means manually combining a name, category, descriptive value or the like for the one or more objects. A series of representative items is collected for a set of objects of interest. These may include but are not limited to images, videos, or other capture examples and or extracted features like color distributions, histograms of oriented gradients, or fractals, to name a few. The training set can include a well-defined association between each of the aforementioned items and their corresponding values or labels. Furthermore, additional sub-labels or attributes may be associated with the items thus allowing for the addition of more content to be associated to what will hence be referred to as the "training data" or "training information." Also, attributes and sub categories will generally not be unique to a particular label and, as such, can overlap with other classes. An example of this would be the labels "chair" and "table" with a common attribute being "furniture".

A "prediction" is the process of substantially automatically assigning a name, category, descriptive value or the like for the one or more objects that may require at least one additional processing step in addition the prediction step whereby a generated object output can be associated with the relevant object(s) as occurring in the scene. Prediction may also be referred to as the act of assigning a class, assigning a labeling, labeling an object, etc.

A "training set" or "object library" is a collection of representations of the object with the associated labels. A training set can be used in conjunction with machine learning algorithms in assigning object recognition properties and property weights, where "weights" refers to the confidence or significance assigned to a given property. Furthermore, optionally, what is commonly referred to as a "look-up table" can be used in which the attributes of a given object are used to create the association with its corresponding label. The training set may further include sub-class labels of a given object. An example of this would be the inclusion of window types for the class "windows." This aspect of the methodology should not be limited to only pertaining to labels, but also to other meaningful attributes or values (like material properties or common dimensions, etc.).

In broad constructs, the present disclosure comprises systems and methods to generate information about one or more objects of interest in a scene. In significant aspects, the present disclosure relates to associating 3D information for the one or more objects with 2D image information for the one or more objects, where all or part of each of the one or more objects are present in a scene. The 2D image information can comprise 2D image information generated from a plurality of images of the scene, where such 2D image information includes the one or more objects of interest and one or more views of a given object in the scene. Processing of the 3D information with 2D image information in an object recognition process as described herein has been found by the inventors herein to provide relevant improvements to the nature and quality of the information that can be obtained about the one or more objects of interest in a scene. 3D information can include information from sources such as point clouds, wireframes, CAD drawings, GeoJSON data, 3D vector models, polygon meshes, 3D models and surfaces, etc. as set out in more detail hereinafter.

In some aspects, the present methodology allows one or more objects of interest in a scene to be detected, recognized, counted and/or identified (e.g., assigned a predicted labeled commonly referred to as "classification" as set out hereinafter) as being present in a scene. For example, a window or a door can be recognized as being present on a building, with or without separate identification of the building or other objects (doors, other windows, etc.). In this regard, the present methodology provides "instance detection." For instance detection, information about the semantic class of one or a plurality of pixels associated with various aspects of the scene, including all or part of an object of interest can be provided. For example, a group of pixels, can be grouped as belonging to or being similar to another group of pixels. In other words, the group of pixels can be labeled as belonging to a semantic group of pixels, without also providing an associated predicted label that identifies the object that appears all or in part in the pixel grouping.

A count of specific instances of objects having characteristics that are the same can be returned using the methodology herein, where such counts can provide information that indicates the singular identity of that grouping of objects without also generation of a label for that grouping. For example, a count of objects that generally or specifically share the same or similar detected features can be returned, without also denoting them as "windows."

Yet further, a predicted label of "windows" can be returned to identify that grouping of recognized objects that generally or specifically share the same or similar detected feature(s). Such predicted labeling can be generated by incorporating 2D image information and 3D information processed according to the methodology herein in machine algorithms, as discussed in more detail hereinafter.

Additionally, specific features of those groupings of objects can be detected as being present in the scene, such as when panes are present in the window or door, where such specific features in the labeled object(s) are separately labeled. In other words, instance detection of sub-objects of larger objects can also be generated herein.

Still further, the specific sub-objects of larger objects, here the individual window panes, can be counted or their labels predicted, or specific instances of such objects or groupings can be returned.

The present disclosure also allows measurement or dimension information of the one or more object(s) of interest in a scene to be generated. Example measures include Euclidean distances with direct metrics within the 3D space and geodesic distances that are metrics along the surface of the object that is represented as a point cloud, for which more complex measure (like area, surface area, etc.) can be derived. The geometry which defines boundary, shape, and dimension of individual objects (e.g., length, width, height, volume, etc. in such non-limiting spaces as the geodesic and Euclidean space) of one or more object(s) can also be determined according to the methodology herein. Such measurements can then be used for a wide variety of purposes, with examples disclosed further herein. The at least one object of interest can have multiple dimensions, such as linear, spatial, or volumetric dimensions, some or all of which may be of interest. As would be recognized, the various structural and/or spatial and/or volumetric aspects of the object(s) will have an actual measurement value that will be obtainable when a physical measurement of the geometry is conducted, such as by a linear measurement tool, an electronic distance measurement tool, or other suitable device. Such generated information can be accurate, as such term is defined elsewhere herein.

Yet further, topology information can be generated using the methodology of the present disclosure. As used herein, "topology" refers to the spatial relationships among objects and object components. Topology information derivable from the present methodology can allow determination of both the physical distance between, by way of one or a plurality of distance values, one or more points or arrangement of points identified on the surface of two or more objects, where such distance information can be characterized in the X, Y, and Z coordinate spaces for each of the objects. Such topology information can be accurate, as such term is defined elsewhere herein. An example of topology would be the series of distances from the windows and doors identified on the facade of a house. Another example could involve the relationships between columns of a space.

The method can also provide semantic information for the object or objects in a scene. Semantic information can be provided through a catalog of known objects. This catalogue may act as something similar to a lookup table in a non-limiting way where the objects detected in the scene may be cross-referenced with catalogue and additional semantic information may be included based on a confident association of the objects to their catalogue representations. Semantic information includes information which defines additional characteristics such as object class, name, material type, functionality, cost, etc. through dedicated attributes.

In further aspects, the methods of the present disclosure can provide information about the orientation and position of the object(s) in a 3D environment. For example, an accurate 3D reconstruction of the object(s) as they occurred in the scene from which the information for the 3D reconstruction was obtained can be generated. 3D reconstruction of two or more objects in a scene according to the methodology herein can be accurate at least as to the placement of those two objects in the scene relative to each other and as to the size of each, wherein "accurate" is as defined elsewhere herein.

Yet further, the methods of the present disclosure can provide location information about the object(s) as it was present in the scene and when coupled with other technologies like GPS can further be georeferenced. For example, if the one or more objects of interest includes a chair that was present in a scene from which the 3D information and 2D image information was derived, the present methodology can provide information regarding where the chair was present in the scene in relation to other objects (e.g., tables, other chairs, etc.) and building structures (e.g., floors, walls, doors, etc.). Inclusion of additional information from technologies like GPS can allow for georeferencing of the object or objects in a scene, allowing for their presence to be shown in mapping tools like "Google Maps". Still further, the methodology herein can be used to generate information about the orientation or placement of object(s) in the scene. For example, the distance of a window from the ground and the top of the building can be provided so that the placement of the window on a building can be accurately mapped. Location information can be accurate, as such term is defined elsewhere herein.

Yet further, the methodology can generate information about the geometry of all or part of an object(s) of interest, such as angles, orientation of elements to other elements, etc. For example, information about the various planes of a roof can be generated, including the pitch thereof. Each of the dimensions of the roof (such as length on the back, front and sides of the structure and the pitch) could comprise a plurality of dimensions that can be generated by the methodology herein. Such geometric information can be accurate, as such term is defined elsewhere herein.

In some aspects, accurate measurement values, dimension values, distance values, etc. for each and between two or more object(s) of interest can be generated from the methodology herein. In one aspect, accurate measurement values, dimensions, geometries and/or distance values for each of the object(s) obtained herein are within about 5% or less of the actual corresponding measurements obtained for the object(s). For example, if the actual value of the length of a wall segment is about 10 meters, the dimension for that same wall segment returned from the methodology herein will be from about 9.5 to about 10.5 meters. Similarly, any measurements, etc., for each of the object(s) derived from the methodology herein are within about 1% or less of the actual measurement values for the object. In this regard, if the length of a wall segment is about 10 meters, the returned measurement value returned for that same wall segment will be about 9.9 to about 10.1 meters using the methodology herein. Similarly, with geometric information, the value returned using the methodology herein will be within about 5% or less or about 1% or less of the actual value for that geometric feature. For topology information and other 3D information generated for at least two objects of interest, the reported placement of the objects in the scene, such as by the reported distance values for one or a plurality of points identified on the respective surfaces of the objects, will be within 5% or less or within 1% or less of the actual distance values for the objects as they occur in the scene. Yet further, the values are within about 0.5% or less, or within about 0.1% or less of the actual value. In some implementations, any one of a measurement, dimension, geometric, topology or other information can be accurate within about less than 5%, or about less than 1%, or about less than 0.5%, or about less than 0.1% of an actual value for that object or objects, where any value can form any endpoint for the value.

Yet further, the methodology herein can be used to generate predicted labels for the object(s) of interest, where the predicted labels generated from processing of machine learning algorithms with object libraries can be associated with the object(s). More information about the labeling process is provided hereinafter. Generally, however, the predicted label can be a label by category, such as furniture, or a type of furniture. For example, the methods of the present disclosure can enable an object in a scene to be labeled as a "window," "door," "furniture," etc. The predicted label can also identify a category as "chair," "table," etc. Yet further, the chair can be labeled as a "Aeron® Chair by Herman Miller—Highly Adjustable—Carbon—HER-AE101OUT-HAC $548.88" or any number of descriptive items similar to those when the necessary information is available in the object catalogue. As discussed further hereinafter, predicted labels generated from the methodology herein can be used in a myriad of applications, such as inventorying, construction, merchandising, insurance underwriting and claim adjustment, civil engineering, mechanical engineering, architecture and design, building information management (BIM), home remodeling, surveying, roofing, flooring, real estate listing, gaming, mixed reality including virtual and augmented reality, among other things. Further still, the aforementioned predicted sub-labels or attributes can provide additional information of the given object including but not limited to its functionality or purpose in a scene, its material or specific color used, etc.

In a significant aspect, the present disclosure incorporates 2D information generated from a plurality of 2D images of a scene, where the scene includes all or part of one or more objects of interest. In such an implementation, this 2D image information is processed with 3D information obtained from the scene. In one specific aspect, the methodology consists essentially of processing 2D image information with 3D information obtained from the scene. Both the 2D image information and the 3D information include information about the one or more objects of interest, so as to allow object recognition to be generated for the object(s).

At least one passive image capture device can be used to generate the plurality of 2D images. Yet further, one or more image capture devices can be used to generate the plurality of 2D images, where such plurality can include, but is not limited to, multiple separate capturing devices or camera arrays.

The plurality of 2D images used herein can be obtained from a moving camera device. Still further, the plurality of 2D images used herein can be obtained from a video camera. The 2D digital images can be generated by an image capture device that comprises a passive sensing technique. The image capture devices used to generate the plurality of 2D images can be "calibrated" or "uncalibrated," as such term is defined in the '517 patent, previously incorporated by reference.

As used herein, "video" means generally that the images are taken, for example, as single frames in quick succession for playback to provide the illusion of motion to a viewer. In some aspects, video suitable for use in the present disclosure comprises at least about 24 frames per second ("fps"), or at least about 28 fps or at least about 30 fps or any suitable fps as appropriate in a specific context.

In accordance with some aspects of the disclosure herein, use of a plurality of 2D images derived from video can improve the ease and quality of user capture of the plurality of 2D images for use herein. As one example of this improvement, the sequential nature of video has been found by the inventors herein to improve object recognition quality, and therefore the quality of attendant measurements and/or labeling results due to an attendant reduction in the errors associated with a user needing to obtain 2D image of suitable quality and quantity for processing herein. Still further, the inventors herein have found that use of video as the source of the plurality of 2D images can allow tracking of points that are inside (i.e., tracking points within the boundaries of the images) or outside of the images of the object of interest (i.e., continuing to track points that are first "followed" when in the image frame, and then tracking estimated positions of those points no longer in the images intermediate in time (the points have moved outside the boundaries of the images). When those points are in the field of view of later image frames, the later-followed points can be substantially correlated to those same features in the earlier image frames), where such point tracking provides improvements in the 2D image information used for processing herein, such as by creating multiple vantage points of full or partial views of the given object. Each providing more information which, in turn, can improve the quality of measurement and prediction. Still further, the inventors herein have found that use of video as the source of the plurality of 2D images can allow tracking of objects in sequential frames. Tracking of objects in sequential frames can provide a basis for prediction from one frame to the next.

While the present methodology is particularly suitable for use with image capture devices that generate a video from which 2D images can be provided, the present disclosure is not limited to the use of video. That is, the plurality of 2D images can suitably be provided by an image capture device that provides 2D still images, such as a "point and shoot" digital camera. These images need the minimum amount of overlap necessary in order to recreate the scene they comprise. The plurality of 2D images herein are suitably overlapping. As used herein, "overlapping" in relation to 2D images means individual images that each, independently, include at least one object of interest, where at least some of the images overlap each other as to one or more dimensions of each of the one or more objects of interest are concerned. As would be recognized, 2D images derived from video will be overlapping. To provide suitably overlapping 2D images incorporating the at least one object of interest from sources other than video, the individual images can be overlapped, where such overlap is, in reference to the at least one object of interest, at least about 50% or at least about 60% or at least about 70% or at least about 80% or at least about 90%. In some embodiments, the amount of overlap in the individual images in the plurality of overlapping 2D images, as well as the total number of images, will also depend, in part, on the relevant features of the object(s). In some aspects, such relevant features include, for example, the amount of randomness in the object shape, the texture of and size of the at least one object of interest relative to the image capture device, as well as the complexity and other features of the overall scene.

As would be recognized, a plurality of still 2D images taken in sequence can also be defined as "video" if played back at a speed that allows the perception of motion. Therefore, in some aspects, the plurality of overlapping 2D images can be derived from a plurality of digital still images and/or from video without affecting the substance of the present disclosure, as long as the plurality of 2D images of the scene including the one or more objects of interest can be suitably processed to generate detailed scene and object information from which the measurements, etc., and predictions can be generated.

In some aspects, the plurality of 2D images includes at least two 2D images of the scene, wherein each of the plurality of 2D images incorporate at least some of the one or more objects of interest. In other aspects, the plurality of 2D images includes at least 5, at least 10, or at least 15 or at least 20 2D images of the scene, wherein a plurality of the 2D images of the scene incorporate at least some of the one or more objects of interest. As would be recognized, the 2D images appropriate for recognizing the one or more objects, or generating one or more of counts or predicted labels or generating 3D information which can then provide some, all, or none of geometric, topological, semantic, and/or any 3D information for the one or more object of interest in a scene will depend, in part, on factors such as the size, texture, illumination, degree of randomness in the object shape, as well as the complexity and other features of the overall scene and potential occlusions of the object of interest, as well as the distance of each of the one or more objects of interest from the image capture device.

As noted, the plurality of 2D images generated for use in the present disclosure can be generated from at least one, or one or more, image capture devices comprising passive sensing techniques. Yet further, the 2D images can be generated by at least one, or one or more, image capture devices that consist essentially of a passive sensing technique. As would be understood by one of ordinary skill in the art, "passive-image capture devices" means that substantially no active signal source such as a laser or structured light (as opposed to camera flash or general-illumination devices) or sound or other reflective or responsive signal is utilized to measure or otherwise sense either or both of the scene and any of the one or more objects of interest.

Additional information may be generated from one or more active devices used in conjunction with the previously aforementioned passive device or devices. As would be understood by one of ordinary skill in the art, "active-image capture" devices means that active signal source such as a laser or structured light (as opposed to camera flash or general-illumination devices) or sound or other reflective or responsive signal is utilized to measure or otherwise sense either or both of the scene and any of the one or more objects of interest.

Yet further, the plurality of 2D images are derived from at least one, or one or more, passive image capture devices, wherein the image capture device is moving relative to the scene where the objects in the scene are moving in a rigid body motion. In other aspects, the 2D images are derived from at least one, or one or more, passive image capture devices, wherein one of the devices is not stationary relative to the scene or the objects. Yet further, the scene and any included one or more objects of interest can be moving relative to the at least one, or one or more, passive image capture devices in a rigid body motion. Additional images or other information may be derived from one or more active image capturing devices which may be stationary or moving as it may be helpful to the process of object identification and detection.

A variety of image capture device configurations can be used to generate a plurality of 2D images suitable for use herein, including image capture devices integrated into a device such as a smartphone (e.g., iPhone® or Galaxy®), tablet (e.g., iPad® or Amazon Fire®), or a wearable device or the image capture devices can be as stand-alone camera device (e.g., a GoPro®). The at least one, or one or more, image capture devices can also be incorporated in a specialized measurement device. The image capture device can also be a computing device, or interface with a computing device, that is capable of implementing the methodology of this disclosure.

While it can be beneficial to use 2D image information that is generated in conjunction with the 3D information (such as by using point clouds derived from the 2D images or using 2D images generated in conjunction with 3D information), the 2D image information of the scene can be generated using one or more image capture devices where such image capture is not generated in conjunction with 3D information capture. These separately generated 2D image information and 3D information sources can be matched for use in the methodology herein via sensor fusion techniques, as such term is known to one of ordinary skill in the art.

The image capture devices can be configured to generate the plurality of 2D images of the scene and one or more objects of interest from ground, underwater, underground, cosmic or aerial locations, where aerial imaging can be conducted by, for example, drones, satellites, balloons, helicopters, unmanned aerial vehicles, airplanes or the like. Ground captures can include any capture taken from an autonomous vehicle, planar or legged robot, or any device with terrestrial locomotive capabilities. Examples of underwater captures include any submersive autonomous or manned vehicle that can capture in any body of water. Cosmic captures, captures taken from space, can be taken by satellites, or manned and unmanned vehicles. Underground captures can be taken by various imaging techniques that are suitably used therein.

In further aspects, the 2D image information processable herein can be provided by "virtual views". Virtual views are defined as 2D representations of 3D information either already provided or derived from other 2D views or 3D information such as a point cloud where a gray scale point cloud can generate depth images and a colored point cloud can generate images with color as the objects would be seen. Virtual views can be generated, for example, through the use of projective modeling which has been estimated from the various other views provided, creating new vantage points and thus new representations for the object or objects in the scene, which can result in an increase in the quality of the extracted information.

As noted previously, the plurality of 2D images comprising the scene and all or part of the one or more objects of interest are processed in conjunction with 3D information about the scene and the one or more objects. The 3D information is configured to include information about the one or more objects in X, Y, and Z coordinates or a combination of latitude, longitude, and altitude as compared to sea level or some other comparable reference. Including but not limited to their layout, sizes or any other 3D information that provides information about the structure of the object or objects within the scene. Moreover, such information can be derived from other sources of 3D information (e.g., wireframes, point clouds, object boundaries, etc.) like AutoCad, building information models, Geojson, GPS coordinates, etc.

With regard to this 3D scene and object(s) information, the 3D information can be derived from point clouds generated of the scene and object(s). As used herein, a "point cloud" is a set of data points in the same coordinate system. In a three-dimensional coordinate system, these points are usually defined by X, Y, and Z coordinates.

Point clouds suitable for use in the present disclosure can be generated by one or more methods known to those of ordinary skill in the art. In separate, non-limiting examples, point clouds for use in the methodology herein can be generated from one or more of still image information, video image information, laser scan information, depth image information, or other methods and can be augmented with GPS or like data to generate information suitable to provide data with appropriate information.

Yet further, suitable point clouds can be generated from the plurality of 2D images of the scene, wherein the plurality of 2D images are generated from a single passive image capture device. In this regard, point clouds suitable for processing according to the methods of the present disclosure can be generated according to the methods disclosed in the '517 patent, previously incorporated by reference. In particular, the '517 patent describes point cloud generation from, in some aspects, a single passive video camera where the camera is moving through the scene, and the processing thereof to generate point clouds having the features described therein.

Point clouds derived from stereographic image capture methodologies can also suitably be used as 3D information processable with the plurality of 2D images to provide object recognition. Yet further, other forms of stereographic imaging can be utilized to generate suitable point clouds for use herein, such as that disclosed in U.S. Pat. No. 8,897,539, the disclosure of which is hereby incorporated by reference in its entirety.

Point clouds derived from structured light imaging devices e.g., the first version of Microsoft Kinect®, Matterport®, Tango®, etc. can also be used. As would be understood, such devices combine RGB imaging with depth detection otherwise known as RGBD images. Such images can be processed to generate point clouds using known methods, such as utilizing MATLAB, or open source software libraries, such as the "Point Cloud Library." Yet further, Tango-derived images incorporate information derived from motion tracking images with integration of accelerometer and gyroscope data to generate detailed information about the movement of the image capture device in space, as well as depth information about one or more objects of interest in a scene. Software configured for use with Tango-derived images can be used to generate point clouds therefrom. Other forms of structured light instruments and methods can be used to suitably generate point clouds for use herein.

Point clouds generated from time of flight imaging devices are also suitable for use herein as sources of 3D information. As would be recognized, a time of flight imaging device computes the distance or depth value based on the known speed of light and based on measuring the time of flight of a light signal between the camera and the reflecting object, for each point of the resulting image. In a time of flight imaging device, the entire scene is captured with each laser or light pulse. The current version of Microsoft Kinect® is a time of flight imaging device.

Yet further, point clouds generated from ground-based or airborne LIDAR can be used herein. One suitable method for generating point clouds from LIDAR is disclosed in US Patent Publication No. US 2009/0232388, the disclosure of which is hereby incorporated by reference in its entirety.

Point clouds suitable for use herein can also be generated from GPS information coupled with provided 2D images. For example, when a number of aerial images having suitable overlap are taken from multiple view angles generated in conjunction with GPS information, a dense point cloud of one or more objects present in a scene wherein the object(s) are georeferenced can be generated.

In addition to 3D information of the scene and object(s) derived from point clouds, 3D information suitable for use in the methodology herein can also be generated from wireframes that comprise representations of one or more surfaces (for example, planar surfaces) of image information derived from the one or more objects of interest in a scene or containing one or more objects such as one plane of a house containing windows and doors, a "wireframe" here being a combination of vertices and edges which represent the structure of one or more connected objects in a scene. A set of wireframes then would define a collection of wireframe objects. The edges and vertices can provide additional information to the predictive models as to points that are important to the structure of objects, the scale of the object or sections of the object. Suitable wireframe generation methodologies for use herein are disclosed in U.S. Provisional Patent Application No. 62/451,700, entitled "Systems and Methods for Processing 3D Information for Structures in a Scene and Wireframes Generated Therefrom" and filed on Jan. 28, 2017, the disclosure of which is hereby incorporated by reference in its entirety.

The 3D information generated for use herein can be processed to improve the information for use in the subsequent steps in the present disclosure. In this regard, the 3D information, such as point cloud information, can optionally be filtered to remove noise and to remove outlier data. The point clouds can be filtered by one or more of statistical noise reduction, smoothing, dual contouring, and outline refinement.

As noted, the 3D information (e.g., point clouds, wireframes, etc.) provided for processing herein incorporates information about the scene and all or part of the one or more object(s) of interest therein. Such scene information can comprise information about one or more of the structure, measurements, color, texture, depth, and the like of the scene and the object(s). Such scene and object information can provide useful information and context to facilitate further processing steps, such as 2D image segmentation and 3D clustering, as well as the reinforced object information that results from the combined 2D and 3D information, as is discussed in more detail below. For example, coloration differences can facilitate segmentation of the plurality of 2D images and the clustering of 3D information, as well as to confirm the correctness of segmentation and clustering, as discussed further herein.

In a processing step, the 2D image information and the 3D information of the scene and the one or more objects of interest therein are combined in accordance with the methodology herein. Such combination is affected by generating projective geometry information for the scene and the one or more objects therein. Such projective geometry information can be generated by applying one or more projective geometry rules, where such rules would be known to those of ordinary skill in the art. For example, points in a point cloud generated from a plurality of 2D images can be back-projected onto corresponding 2D images to provide combined 2D and 3D information. Triangulation can also be conducted with respect to the 2D imaged, for example. The combined 2D and 3D information will include 2D and 3D information about the scene and the one or more objects, as would be recognized.

In separate aspects, processing of the plurality of 2D image information and the 3D information can be conducted to generate a plurality of segmented 2D image information and a plurality of clustered 3D information. The 2D information can be segmented in such a way that each image is segmented in order to capture the object or object(s) of interest in the fewest amount of segments as possible where each pixel belongs to one and only one segment. The 3D information can be clustered in such a way that the points are broken up into one more groups of points where each point belongs to one and only one group.

Segmentation and clustering of the 2D image and 3D information, respectively, of the scenes and the one or more objects in the scene may be conducted by associating regions in the image information that comprises pixels with similar features (e.g., color, texture, intensity, etc.). Alternative segmentation and clustering may comprise other types of perceptual grouping (e.g., contour detection, foreground vs. background elements, etc.).

In non-limiting examples, techniques that can be used for clustering of 3D information, respectively, include but are not limited to, one or more of:

Region-based methods (seeded or unseeded) relating to combination(s) of nearby similar points;

Attribute-based methods whereby attributes are determined and calculated to group points (e.g., density, distance, horizontal/vertical distribution), tangents, curvature, local density, heat-based dissipation methods, normal or the like; Model-based methods relating to geometric shapes (e.g., RANSAC);

Graph-based methods relating to modifying the point cloud into at least one graph of connected points and edges;

Euclidean Cluster Extraction as disclosed in http://www-.pointclouds.org/documentation/tutorials/cluster_extraction.php (retrieved Dec. 20, 2016);

Min-cut as disclosed in Golovinskiy, Aleksey, and Thomas Funkhouser. "Min-cut based segmentation of point clouds," Computer Vision Workshops (ICCV Workshops), 2009 IEEE 12th International Conference on. IEEE, 2009;

Smoothness as disclosed in Rabbani, Tahir, Frank Van Den Heuvel, and George Vosselmann. "Segmentation of point clouds using smoothness constraint," International Archives of Photogrammetry, Remote Sensing and Spatial Information Sciences 36.5 (2006): 248-253;

Density as disclosed in Unnikrishnan, Ranjith, and Martial Hebert. "Robust extraction of multiple structures from non-uniformly sampled data." Intelligent Robots and Systems, 2003. (IROS 2003). Proceedings. 2003 IEEE/RSJ International Conference on. Vol. 2. IEEE, 2003;

3D Hough Extraction, as disclosed in https://www.researchgate.net/publication/228610502_3_D_building_model_reconstruction_from_point_clouds_and_ground_plans (retrieved Dec. 20, 2016);

The methodology disclosed in U.S. Pat. No. 9,269,022, the disclosure of which is hereby incorporated by reference in its entirety; and Material-based methods such as disclosed in U.S. Pat. No. 8,565,536, the disclosure of which is hereby incorporated by reference in its entirety.

One or more of the following can be used in the segmentation of 2D image information:

Edge-based methods relating to shape components of the object of interest; and

Extraction of one or more original object templates from at least one plan-view images as disclosed in U.S. Pat. No. 7,003,136, the disclosure of which is hereby incorporated by reference in its entirety.

Specifically with respect to segmentation of the 2D image information, segmentation can be conducted according to one or variety of techniques known to those of ordinary skill in the art. As would be recognized, segmentation endeavors to break up an image into meaningful or perceptually similar regions. Image regions across multiple 2D images of the scene in which the object(s) of interest are included can be combined to provide the region/location in which the object(s) appear. In this regard, different features present in the scene are sought to be differentiated/separated from the scene and each other to allow the extraction of useful information therefrom.

One method of segmentation of 2D images can be conducted by placing each object of interest (or parts thereof) into a fewest number of segments possible, while at the same time capturing as high a ratio the object(s) to not the object(s) per segment, i.e., each window will be in only one segment with as little of the overall scene (or not the object(s)) in that segment per point cloud and image. Generally, algorithms useful in the segmentation of the 2D images herein to generate segmented 2D image information can comprise one or more of K-means (exclusive clustering); Fuzzy C-means (overlapping clustering); hierarchical, and Mixture of Gaussians (probabilistic clustering). Specific methods of 2D image segmentation are described in U.S. Pat. Nos. 9,269,017, 9,298,984, 9,317,676 and 9,349,076, the disclosures of which are hereby incorporated by reference in their entireties.

Furthermore, segmentation and clustering can be approached in one of three manners where the first approach can be unsupervised. Utilizing only the data or features extracted from the information, the images can be segmented using one of the various aforementioned methods. For example K-means is a traditional approach where when k-centroids, typically randomly generated from the feature space, are provided an association is established via a distance in the feature space such that the following objective function is optimized:

$$\mathrm{argmin}_C \sum_{i=1}^{k} \sum_{x \in C} \|x - \mu_i\|^2$$

with $\mu_i$ denoting the i-th centroid. Once an association is established, a new average is calculated with its value replacing the initial value. The information is re-assigned using the same metric and the process continues in a manner such that the groups' averages eventually converge and the information has been segmented accordingly.

Another approach is the use of supervised methods. These methods employ the use of predefined models which are established a priori through the use of annotated training data. A non-limiting example of this is the defining of a mixtures of Gaussians model. Extracted features are modelled in a mixtures of Gaussians with each group getting its own model based on the group's features. This involves the estimation of a mixtures model:

$$\sum_{i=0}^{M} \pi_i N(x, \mu_i, \Sigma_i)$$

where $\pi$ denotes the weight, $\mu$ the average, $\Sigma$ the covariance, and M the number of Gaussian's used for modelling the set.

Semi-supervised methods are a combination of both supervised and unsupervised methods. These methods utilize a priori knowledge from an annotated training set to create an initial model but go further to employ unsupervised methods that allow the model to evolve and account for new examples.

Region growing is a region-based image segmentation method that can be applicable herein. As would be recognized, region grow is premised on the understanding that pixels belonging to a specific object generally possess similar attributes locally, especially in relation to background elements in the scene or other objects that are not connected to the objects of interest. For example, pixels associated with an object of interest may comprise the same coloration across a substantial portion of the object's surface and these like elements can be grouped together for determination of whether they are likely to comprise all or part of the object(s) of interest in the scene. In some aspects, other types of region-based segmentation methods can suitably be used herein. Furthermore, initial seed points can substantially be determined in a robust manner for the direct evaluation of the object or objects within the scene.

Upon generation of the segmented 2D image information and clustered 3D information about the scene and one or more objects, a plurality of cross-referencing steps can be performed. Without imposing an order, each of the 2D segments can be compared with their respective 3D clusters through projective geometry and vice versa. The process will iterate until a final set of mutually exclusive 3D clusters with their corresponding 2D segments is determined, thus a validated grouping is provided. Generally, the output of the plurality of iterations is the detection of the full or partial representation of one or more objects of interest from the scene. In this regard, at least a count of the object(s) of interest without any predicted labeling can be returned without additional information about the objects.

The output of the cross referencing procedure between the 2D and 3D information can also be characterized as validated 2D and 3D information, where such validated 2D and 3D information is suitable to provide geometric information, either or both geodesic or Euclidean, about the one or more objects present in the scene. If more than one object of interest is present in the scene, topology information can also be generated. Such generated geometric or topological information can be accurate, as such term is defined herein.

The output information, for example, geometric and topological information, can be either estimated or directly predicted. Training data can include directly associated with objects with known geometric and topological information. Topological information in this case would be information pertaining to objects which are often found together, as part of the same scene, or related to one another in a meaningful way, such as having complementary functionality. This information can be trained and thus returned using a valid, that is, appropriate, machine learning algorithm. However, these properties can also be estimated directly from the extracted information. For example, geometric information, such as dimensions, can be estimated within the Euclidean or geodesic space of the object or objects in the scene.

In addition to the geometric or, in cases of multiple objects present in the scene, topological information obtainable from the methodology herein, further object recognition improvements are achievable with the methodology herein. In this regard, the present methodology can generate various representations for the objects of interest to be further processed for the determination of their class.

The one or more object(s) of interest in the scene can be labeled in total or in part subsequent to appropriate processing with one or more prediction models. Because the 2D image information has previously been combined with the 3D information, for example, with point clouds derived from the 2D image information, the equivalent points in each 2D image having that same point in the associated point cloud can be determined through the projective geometry step.

Multiple perspectives of the object can be captured via the use of virtual views (as defined earlier herein) or the already provided 2D captures with their location as determined by the projective geometry. Each view can provide additional information for each given object of interest and thus increasing the quality of the features to be used in the determination of its predicted label.

Multiple bounding boxes can be defined for the projective views of each object of interest (one bounding box per view), with the dimensions of the box determined to encase its corresponding object. Each bounding box serves as an up close and isolated view for each object of interest. Each bounding box may capture all or part of the object, however, given the projective geometry associating it to the 3D representation, each view serves as evidence towards the determination of the object predictive label.

The validated 2D image information, the 3D information, or their combination can be input into machine learning algorithms to generate predicted labels or predictions for the object(s) of interest by processing the extracted features or appearances from the 2D, 3D or their combined information. Once more, machine learning algorithms can be trained using information present in one or more training sets derived from images, 3D information, and/or other information, where the previously indexed object information is likely to comprise information about the object(s) of interest so as to allow the one or more objects of the scene to be accurately classified.

Each machine learning model will be trained. Following the traditional supervised learning approach, as previously established a training set of the data, with representations in the form of the object's appearance and features is provided via manual annotation by an expert, and needs to be established a priori. Training then involves allowing the algorithm to take in the input information and learn the necessary model that will associate the input features or appearances to their corresponding label via the algorithm. Examples of such algorithms include, but are not limited to the use of SVMs (support vector machines), randomized decision forests, convolutional neural networks and adaboost. Each of the aforementioned algorithms can be optimized according to their respective loss functions. A non-limiting example of a general loss function is $\operatorname{argmin}_\delta \max_{\theta \in \Theta} R(\theta, \delta)$. It is commonly referred to as the min-max loss function. It determines the best $\delta$ minimizes the maximal possible loss $\theta$. Other qualifying methods can be employed to evaluate the performance of the system. These include but are not limited to the system's accuracy, recall, and error. Such methods can be employed to improve the robustness in the algorithm's predictive capabilities by means of cross-validation.

A variety of cross-validation methodologies can suitably be used in the present disclosure including, in non-limiting examples, leave-one-out cross-validation and/or k-fold cross validation. For example, in k-fold cross validation, the original dataset may be divided into k chunks. For each round of validation, one of the chunks is the evaluation dataset and the remaining chunks are the training set. For each round of validation, the chunk being used as the evaluation dataset is changed. In leave-one-out cross validation, each instance to be evaluated by the model, combined and/or clustered information can comprise a chunk. Hence, leave-one-out cross validation is the case of k-fold cross validation where k is the number of data points (each data point is a tuple of features). The combination of the evaluation results to produce the performance result may be by averaging the evaluation results, accumulating the evaluation results, and/or other statistical combinations of the evaluation results.

Multiple machine learning models can be trained and used. This is referred to as a "mixtures of experts" or "ensemble," where each model is trained on all or part of the training data. Furthermore, an additional layer of logic can be applied to the outputs of each method to determine a weighting function that would give priority based on the performance of each method. Once more, cross-validation can be used to improve and determine each method's performance and their predictive capabilities as a whole.

Predicted labels can be generated for the object(s) of interest using one or a number of techniques known to those of ordinary skill in the art. In non-limiting examples, object(s) in the images can be labeled according to the methodology described in U.S. Pat. Nos. 8,254,699, 9,269,017, 9,298,984, 9,349,076, and 9,424,493, the disclosures of which are hereby incorporated by reference in their entireties.

In some aspects, 2D and 3D information derived from the plurality of 2D images of the scene and 3D information about the scene are provided for processing in predictive models, whereby the predictive models can be used to identify and/or label the one or more objects of interest. Given the probabilistic nature of the methodology herein, it is likely that multiple labels may be generated for the object(s) of interest. Accordingly, the multiple labels will have to be resolved to provide a single most likely predicted label for each of the object(s) of interest or a set of most likely labels with a cutoff of number of labels or confidence. A label decision step is therefore performed. Given the various confidences assigned to a given predicted label from the various algorithms employed to make said prediction, a final label prediction is made with the assignment defined by the class or label with the highest confidence amongst the methods or a set of labels is returned with a cutoff number or confidence. Once more, as was referenced previously, an additional layer of logic can be used, employing another machine learning algorithm which can define weights for each of the predictive models, then the output would define the final predicted label or class.

As would be recognized, accurate labeling or classification will suppose that the object libraries processed along with machine learning algorithms already include the requisite object information to enable accurate labeling of the object(s). A plurality of "ground truth" information can first be generated for information that is likely to occur in the scenes. In this regard, the object libraries processed with the machine learning algorithms can first be "seeded" with information pertinent to scenes and object(s) likely to be analyzed according to the methodology herein. For example, a database of object(s) to be used as an object library herein can be generated that incorporates scenes and objects. Such a basic object library can be generated all or in part using supervised learning, that is, by human management, to generate a substantially complete ground truth library of objects extracted from scenes for subsequent processing in machine learning algorithms in which a scene with such object(s) are included for analysis. In this way, sui generis scenes with objects therein can be analyzed, where the objects in the scenes are likely to be present in an object library used along with appropriate machine learning algorithms. The various parts of the house (e.g., windows, doors, facades, etc.) in a scene image can be identified by a human initially to generate a plurality of ground truth object information for use in an object library, and such information can be processable with machine learning algorithms for objects of interest that may be present in sui generis scene information provided for analysis according to the methodology herein. Similarly, information about furniture, fixtures, landscape elements, equipment, and the like can be generated for inclusion into object libraries for use with machine learning algorithms, where scenes and object(s) that incorporate such features are within the scope of locations that can be analyzed with the current methodology.

As would be recognized, the machine learning predictions can be improved through continuous updates in the training in both a supervised and semi-supervised manner along with additional training for the models on the additional information. Thus, it is anticipated that, over time, inclusion of new information generated from the methodology herein in the object libraries used subsequently to analyze new scenes and object(s) information will improve in their ability to accurately predict the subsequent object(s) of interest. In some aspects, the systems and methods of the present disclosure incorporate "weak supervision" or "light supervision," with respect to the object recognition and/or labeling process. In some aspects, weak/light supervision can be provided to the object recognition and/or labeling process at the early stages of the creation of an object library for a particular location (e.g., a specific subdivision or auto dealership) or type of environment (e.g., a generic subdivision or auto dealership), whereby the weak/light supervision better ensures that the object library is populated with validated object information as per the supervised approach. However, the method may employ semi-supervised methods to extend its representative capabilities without the explicit annotation of an expert.

In some aspects, therefore, the new additions to the training sets or object libraries can be made from the object(s) that are predicted and validated with light supervision in which a human may readily "eye-ball" the results to confirm correct results or throw out bad results.

As an object library for the location or environment becomes populated with new relevant object information provided by the method and the machine learning algorithms are further trained as to the object content of the location or the type of environment, the object recognition and/or labeling process can become substantially unsupervised, as per the semi-supervised approach. This can enable the capture of a variety of validated object information for use with the machine learning algorithms so as to generate a higher quality object library and, as a result, a higher quality object labeling output. Even with substantially unsupervised processes, from time to time, a human, optionally, can be used to validate at least some of the automatically object predictions.

When a human verifies the object recognition/labeling, such objects can be provided for verification in a collection, such as a page of items presented on the scene (e.g., a plurality of building features such as doors, windows, façades, etc. or fixture elements such as piping, HVAC, electrical components, etc. or furniture such as chairs, desks, etc.) to allow the human to more quickly verify the information than is possible with individual verification of the objects. Such human verified object recognition/labeling can be incorporated into a training set relevant to a location or environment for later use along with the machine learning algorithms. to identify object(s) of interest in a scene.

Over time, the machine learning algorithms can learn object characteristics substantially without the need for human supervision, and the resulting information can then be used to perform efficient and accurate object recognition-related activities for newly provided object recognition information, even those for which little or no substantive information about the scene is known beforehand, as long as the object(s) or variants there of appearing in the scene have previously been labeled and included the training set used with the machine learning algorithms. The object information derived from this object recognition can further be stored in object libraries relevant to one or more locations or environments for later use.

Methods of generating predictions based that can be used in the present methodology are disclosed in U.S. Pat. Nos. 9,269,017, 9,269,022, 9,349,076, and 9,424,493, the disclosures of which are hereby incorporated by reference in their entireties. Each of these one or more machine learning algorithms, as well as others known to those of skill in the art, can be used in the labeling of all or part of the at least one object of interest.

Yet further, topological information can be utilized in conjunction with the labeling to assist in generating functional context about the one or more objects. For example, the predictive models may include information relating to the likely location of an object relative to another object, where such relative location information is provided by topology information about two or more objects. In this regard, the predictive models could have been trained to ascribe a low probability that one object may be located to another object. If the labeling step returns a label for the object(s) that is unlikely to exist in real life, the label can be rejected, even though the predictive model applied in the absence of topology information ascribed a high probability to that occurrence. As an example of such contextual functionality available in the present disclosure, the probability model associated with the labeling step could return a high probability that a first object in a scene is a refrigerator, and the second object in the scene is a toilet. Because it is unlikely that a refrigerator will be located close to a toilet in real-life situations, predictive models incorporating information about the types of objects that may occur in close proximity in a scene can be used to correct such labeling to reduce the possibility of incorrect object labeling. Such information can be incorporated into one or more machine learning algorithms for subsequent use so as to improve the algorithm for future use. Moreover, for low likelihood situations, like a toilet occurring in close proximity to a refrigerator, the result can be flagged for review by a human. If the flagged object recognition/labeling information is determined to be incorrect by the human, the result will not be added to the training set. Because the likelihood of a toilet appearing in close proximity to a refrigerator will likely remain low even though such proximity was correct in this instance, it will likely be desirable for the functional context information to not be changed in such an instance. However, the human can generate a decision about whether to update the functional context information, if deemed appropriate.

In addition to labeling, additional semantic information can be included for the one or more objects of interest. Semantic information can be present in training set relevant to scenes and objects processable according to the methodology of the present disclosure. Such semantic information has utility for use in BIM applications, among other things. As would be recognized, "semantic information" can comprise a wide variety of contextual information about object(s), and such context can add value in addition the generation of labels for the object(s) as discussed hereinabove. For example, upon making a prediction of one or more objects present in the scene, semantic information that is associated with such labels can be provided for use (e.g., the object's subtype, current use, or other qualifiers). Such semantic information can vary widely, and will be dependent on the scope and content of information available and relevant for a particular labeled object.

As one example of semantic information that can be applied to a labeled object, information describing how the object is used, why the object is used, what the object is used for, or when the object is used can also be returned. Yet further, information relevant to maintenance records for the object(s), lifecycle information, origin, class, known dimensions, color, shape, features, brand, identification number, supplier information, cost, MSDS information, warranty information, etc., can also be returned.

Use of labels and semantic information along with geometric information can generate information about the other possible geometric properties of the object(s), for example, thus enhancing the overall knowledge about the object(s) such as where a labeled object can have various possible sizes or dimensions. Such semantic information can greatly add to the usability of the object recognition techniques herein. A non-limiting example can be a chair whose variants can range in having different sizes, subtle appearance differences, and or colors.

The object recognition process need not be embodied in a single physical machine, but rather may be partitioned across multiple physical machines or logical storage units in a number of different manners. For example, the libraries of object information may all be stored within a single relational database management system, e.g., as different tables of a single database, or may be stored on separate machines, or may be partitioned or duplicated across machines. The different types of visual content within libraries of image information, such as still images and videos, may likewise be stored in separate repositories on separate machines, such as one repository for still images and another for video, either of which may be partitioned across multiple machines. Similarly, the analysis and the object recognition module may execute on machine separate from the machines on which the 2D image information, 3D information and object libraries are stored. Likewise, a server could execute on a separate machine. For example, the image information can be present on a mobile device, whereas the processing of the image information with the 3D information and object libraries can be conducted on a server located "in the cloud."

The object recognition process need not be embodied only in a single physical machine or multiple physical machines but may be partitioned across one or more components of one or more physical machines. For example, the process may be divided across one or more CPU and/or GPU units where CPU and GPU units are common to one well versed in the art. Any part of the process could execute on any number of these devices which may be physically located on the same or different physical machines.

In some aspects, the object recognition/labeling methodology of the present disclosure can be augmented by additional steps. In this regard, further processing of 2D and 3D information can be conducted to improve the results therefrom. For example geometric information, topological information, etc. can be verified, and such verified information incorporated into the object libraries for subsequent use. For example, if a measurement for an object is generated from the validated 2D image information and the validated 3D information, and that object is labeled as a "window," the returned measurement can be verified as being likely to be correct. Such verification can be automatic. If the training set in use indicates that the specific object should be labeled as a "window," where the known length and width of the window in that training set is A feet by B feet, the measurement returned automatically from the processing steps herein can be verified as being correct. If the training set does not conform to the measurement information for that object as labeled, the information can be flagged for review by a human or other validation engine.

Yet further, the returned geometric, topological and other information can be confirmed through use of one or more sources for which validated measurements, dimensions, geometry or topology information, etc. is present in the object libraries in use. Methods of manually, semi-automatically, or automatically providing measurement information by using an intrinsic reference for the object(s) present in the scene are disclosed in detail in U.S. Pat. No. 9,460,517, the disclosure of which was previously incorporated by reference.

By way of summary from the '517 patent, which summary should not be considered a characterization of the actual disclosure of the '517 patent, the intrinsic reference can be an object of known dimensions placed or identified in the scene. For example, a yardstick can be placed in the scene, and returned measurements can be validated against this known information that is also present in the scene. Yet further, an object with a standardized size is identified as being present in the scene, such as a switch plate cover, can be used to validate returned measurements, dimensions, topology information, etc. A user can also input manually generated measurements obtained from one or more aspects present in the scene, and use those manually generated measurements in the validation of the measurements, dimensions, geometry, or topology information returned from the methodology herein.

In a further example, the geometric, topological and other information can be confirmed or validated through use of information generated from a measuring device, such as a laser scanner. The information from the laser scanner can be integrated, such as using sensor fusion techniques, with the validated 2D image information and 3D information for the object(s) to allow the measurements, dimensions, geometry, or topology information to be compared.

In a further aspect, information generated from the methodology herein can be collected to generate one or more object libraries. In this regard, the measurements, dimensions, geometry, topological information, labels, and semantic information generated by the process steps herein can be collected for use. Such information differs from the nature and quality of prior art object library information due, at least in part, to the inclusion of new information and of the information obtained according to the inventive methodology. Moreover, when machine learning algorithms are trained using the information generated herein, the quality of the object libraries will continue to be enhanced. The inventive libraries of object information can be used in conjunction with public/open source libraries of object information, and the object information therefrom will be improved over the public/open source library itself.

As noted previously, the outputs herein, that is, the measurements, dimensions, geometry, topology information and object labels, or more generally, the labeling, etc., for the one or more object(s) of interest in the scene have applications in a number of useful areas, including, but not limited to: inventorying, construction, merchandising, insurance underwriting and claim adjustment, civil engineering, architecture and design, building information management (BIM), home remodeling, roofing, flooring, real estate listing, gaming, mixed reality, virtual reality, augmented reality, among other things.

With regard specifically to BIM applications, as would be recognized, BIM is a digital representation of physical and functional characteristics of a facility, building, space, etc., which will necessarily incorporate information about objects present therein. A BIM is a shared knowledge resource for information about a facility forming a reliable basis for decisions during its life-cycle; defined as existing from earnest conception to demolition. BIM involves representing a design as combinations of "objects"—vague and undefined, generic or product-specific, solid shapes or void-space oriented (like the shape of a cone or more), that carry their geometry, relations and attributes. BIM design tools allow extraction of different views from a building model for drawing production and other uses. These different views can be made automatically consistent, being based on a single definition of each object instance. BIM software also endeavors to define objects parametrically; that is, the objects are defined as parameters and relations to other objects, so that if a related object is amended, dependent ones will automatically also change. For the professionals involved in a project, BIM enables a virtual information model to be handed from the architect or design team to the main contractor and subcontractors and then on to the owner/operator; each professional adds discipline-specific information to the single shared model. This seeks to reduce information losses that traditionally occurred when a new team takes 'ownership' of the project, and provides more extensive information to owners of complex structures.

When used in the BIM context, the systems and methods of the present disclosure can suitably be used to generate information about the object(s) present in a facility, where such objects comprise infrastructure, fixtures, materials, utilities, features, components, and the like. The generated measurements, dimensions, geometries, topography, labeling, and semantic information can be utilized to provide a deep and relevant collection of information set about a building or facility, where such collection can be used in BIM applications. Information can be generated in accordance with the methodology herein for use of each part of a building structure for which BIM can be relevant, for example, CAD design, structural analysis, detailing, HVAC, plumbing, electrical, interior finishes, and the like.

Moreover, the methods herein can be used in lifecycle management of a facility, scene, or site in that the presence, absence, or modification of previously identified objects, etc. can be tracked over time as part of the BIM application. For example, the progression assembly of various infrastructure within a facility can be tracked in changes in the measurement, dimensions or topology of information returned can be monitored in time. The automated, or semi-automated nature of the methodology herein can reduce the need for in-person monitoring of the facilities and, as such, BIM applications can be enhanced.

Semantic information generated according to the methodology herein provides improvements in BIM applications. For example, if an object is identified as an HVAC system, for example, further information about that HVAC system can be generated when such further information is available in one or more libraries of information associated. For example, the original design drawings for that HVAC system can be available, as well as any service records, warranty information, parts lists, etc.

In the context of MR (mixed reality), which includes AR and VR, augmented reality (AR), which can be combined with BIM, as well as other applications provides a real-time view of a physical, real-world environment in which the view is augmented with computer-generated virtual elements, which may include sound, video, graphics and/or positioning information. Some mobile computing devices provide augmented reality applications that allow users to see an augmented view of a surrounding real-world environment through a camera of the mobile computing device. One such application overlays the camera view of the surrounding environment with location-based information, such as local shops, restaurants and movie theaters. Incorporation of the methodology herein in conjunction with AR can enhance current applications such as by allowing the information extracted from the scenes to be better utilized. Creating the digital content for the AR application is only part of the challenge. Positioning the digital overlay in the camera view is another challenge that can be overcome with this methodology. This application can generate dynamic feature points in any scene to recognize where the AR objects should be in the view. Today, this may be done with GPS, registration targets, or other computer vision technique. However, the ability to recognize specific objects in 2D/3D provides more accurate spatial intelligence to overlay the AR objects to improve user experience and interface. This level of accurate spatial intelligence can transform AR applications from location-based consumer-focused overlays to more commercial applications focused on proving visualizations for training and educating engineers, designers, architects, and construction workers.

The systems and methods herein can further be used in virtual reality applications. As would be recognized "virtual reality" (VR) is the term used to describe a three-dimensional, computer generated environment which can be explored and interacted with by a person. That person becomes part of this virtual world or is immersed within this environment and whilst there, is able to manipulate objects or perform a series of actions. The information generated herein can be used to improve the quality of virtual reality environments. Today, creating a VR environment is extremely time consuming and takes hours of manual effort. With the ability to automatically detect, identify, and extract 2D/3D objects the time and effort to create a VR environment of the physical world is drastically reduced. Whether it is a 3D model with extracted objects or the ability to stitch together images to create an immersive digital model, the methodology herein can be used to modify or transform how content for VR environments is created/generated. These types of immersive models can be used for but not limited to videogames, real estate walkthroughs, and training/educational programs for commercial and industrial applications. Most importantly, this application makes it possible for any consumer or commercial user to automatically generate an immersive VR model from any passive or active sensor device.

The systems and methods herein can further be used in gaming applications. As would be recognized "gaming", or "video gaming", is the term used to describe a game played by electronically manipulating images produced by a computer program on a television screen or other display screen. Types of video games include massively multiplayer online (MMO), simulations, first person shooter (FPS), action, stealth shooter, educational, and other game types. Today, creating a gaming environment is extremely time consuming and takes hours or weeks or months of data collection and programming by the game developer. There is an interest in providing the user, or gamer, with the ability to bring their own location information, or local scene information into the gaming environment, simulating the game taking place in their room or home or street. This experience could be considered a fully immersive video game experience. In this game experience, the player's scene could be combined or integrated with the game developer-created scene, or replace it entirely, and the experience would seem like it takes place in the gamer's scene, e.g., his or her room. The room or aspects or objects from the room could be integrated or included in the gaming experience. With the ability to automatically detect, identify, and extract 2D/3D objects and provide semantic information about the objects using a passive camera the inventive technology could enable this immersive gaming experience. The game would need a predetermined interface definition in which scene information is described, since the game actions would rely on interacting with aspects of, or objects, in the scene. This interface can be a specification of information content and format and electronic method for exchanging the information. It can be assumed that this interface would include basic scene information such as geometry, volume, structure, and appearance. It would also include descriptive information about relevant objects in the scene, including what they are, topology and where the objects exist in the scene and relative to each other, geometry, volume and appearance. Examples of gaming actions benefiting from object specific information include doors and openings in which the game allows passage of the user or other characters or objects, windows in which the user could see through or could be broken or opened or other actions of a window, or a cup of liquid on a table in which the game could cause it to fall over or enable the user or character to pick it up. Additionally, semantic information provided by the inventive system can enable the game developer to build more powerful functionality into interaction with the objects, such as weight and whether an object is movable or force is needed to move it, the material from which the object is made and how it should appear or react to force applied to it, or material and whether it should bounce or break. These are just representative examples but there are endless benefits from identifying objects and detailed information about the objects in the scene. There is great value in a gamer being able to bring their scene to the game environment using just a passive camera. The inventive technology could be built into the passive camera or into the game console or game controller to enable this functionality.

Yet further, the systems and methods can be used to create inventories of objects, such as furniture or components of value that are present in a facility or similar environment. For example, information about high value components, such as automobiles can be generated from a scene. In this regard, the number and type of automobiles present in a storage lot can be generated using the methodology herein.

Surveying operations can benefit from the inventive technology. With all the advances in autonomous vehicle navigation, there is a need for well-defined maps of both populated and unpopulated areas. There is already a series of literature as far as detection of objects for the purpose of obstacle avoidance and safety. However, there is still the open topic of recreating the space around a moving vehicle with both geometric, topological and semantic information, for example.

The inventive methodology can also aid in object avoidance for autonomous driving and drones. Recreating a scene and knowing the objects that occupy in that scene is a complex process that will greatly aid in the ability for autonomous vehicles to navigate safely and effectively.

The inventive methodology can also aid in navigating in an unknown environment. Navigating an unknown environment can be a time-consuming and potentially dangerous process. This technology can enable autonomous craft to explore the environment first and recreate the scene accurately and with context in order to provide a clear means of navigation.

Still further, the inventive methodology can help first responders to navigate in an unknown place, a collapsed structure, or find people unable to respond. These situations can often be dangerous and full of confusion. By leveraging this technology an autonomous craft can be sent in to navigate any unknown areas, find paths through structures which may have collapsed or become damaged, provide semantic information about damage, and detect people or animals which may be in need.

In conjunction with the methods herein, in some aspects, the software associated with the image capture device and/or the hardware into which the image capture device is integrated is configured to provide the user with interactive feedback with regard to the image-acquisition parameters. For example, in some aspects, such interactive feedback provides information regarding the object of interest including whether the tracking is suitable to obtain a plurality of overlapping 2D images necessary to provide suitable images for use herein, as well as any 3D information to be used herein. In some aspects, such processing is conducted in the image capture device itself or the hardware in which the device is integrated (e.g., smartphone, wearable device, etc.). In other aspects, the processing is performed "in the cloud" on a server that is in communication with the image capture device/hardware. In other aspects, the processing is performed on any device in communication with the image capture device and/or hardware. In some aspects, such processing is performed on both the device/hardware and an associated server, where decision-making regarding the location of various parts of the processing may depend on the speed and quality that the user needs results. Yet further, in some aspects, user feedback is provided in real time, in near real time or on a delayed basis.

Yet further, in some aspects, the user display of the output herein thereof is configured to provide user generated inputs to facilitate and enhance generation of the plurality of 2D images, 3D information, and/or the extracted object information. In some aspects, such user generated inputs can include, for example, the level of detail, a close-up of a portion of the object(s) of interest and any associated image or generated point cloud, optional colorization, a desirable level dimension detail, etc.

In a further aspect, the software associated with the image capture devices and methods herein is configured to provide an accuracy value for the generated measurements, dimensions, topology, labels, semantics, etc. By reporting a level of accuracy (where such accuracy is derivable as set out elsewhere herein), a user will obtain knowledge about accuracy of the extracted measurement or other dimensional value, or a probability that the returned label and/or semantic information is accurate with respect to the one or more objects of interest.

In some aspects, the software associated with the image capture devices and/or hardware in which the image capture device is integrated is configured to elicit and receive from the user a selection of a region/area of interest in a captured image(s) of the object of interest from which 2D image and 3D information about the scene and one or more object(s) are derived. For example, in some aspects, when a scene in which one or more objects of interest is captured, the software elicits and receives selection of specific object(s) that are recognized in the scene or for which other information can be provided (e.g., measurements, dimensions, topology, labels, semantics). In this regard, the software can return a query to the user that asks him to confirm that a recognized object(s) is of interest. If the user affirms that the indicated object(s) is of interest, further information about the object can be returned. In an exemplary configuration of such an implementation, the scene presented to the user through a viewfinder or screen on the image capture device elicits and receives the selection of an object present in the scene such as by touch or other type of method. The object of interest can be provided for selection by a computer or a user.

Referring to FIG. 1, shown is a flowchart illustrating an example of a process 100. Beginning at 105, 2D images of a scene are provided that are derived from one or more single passive image capture devices. The 2D images include overlapping 2D images with one or more objects, and can be derived from video. At 110, one or more object(s) of interest are selected. The object(s) of interest selection can be selected by the machine or computing device, by a user, or a combination thereof. The 2D images can be used at 115 to generate 2D image information, where at least a portion of the 2D images include the selected object(s) and are overlapping as to all or part of the selected object(s). The 2D image information 120 includes information about the selected object(s).

3D information is provided at 125, wherein the 3D information comprises information of a scene that includes all or part of the selected object(s) of interest. As discussed above, the 3D information can comprise a plurality of point clouds, wireframes, or other sources of 3D information. If the 3D information may be generated from the 2D images 105 as long as that information fits the criteria necessary to generate a point cloud. In 130, the 3D information 125 and 2D image information 120 is processed to generate projective geometry information that combines the 3D information and 2D image information in 135. This projective geometry information includes information about all or part of the selected object(s) and establishes relationships between either or both of the 3D information and 2D image information incorporates all or part of the selected object(s).

The 3D information is also clustered in 140 to provide clustered 3D information in 145. The clustering partitions and groups 3D data points in the 3D information. By clustering the 3D information associated with all or part of the selected object(s), clustered 3D information can be generated that includes information about measurements, dimensions, and/or geometries for the selected object(s), and/or topology information related to two or more selected objects. This extracted information can be used to identify the selected object(s) as previously discussed. While the flowchart of FIG. 1 illustrates a specific order, alternate implementations are included within the scope of the present disclosure in which the depicted steps or elements 105-145 may be executed out of order from that shown or discussed, including substantially concurrently or in a different or reverse order, depending on the functionality involved, as would be understood by those reasonably skilled in the art of the present disclosure.

Figure 2A:
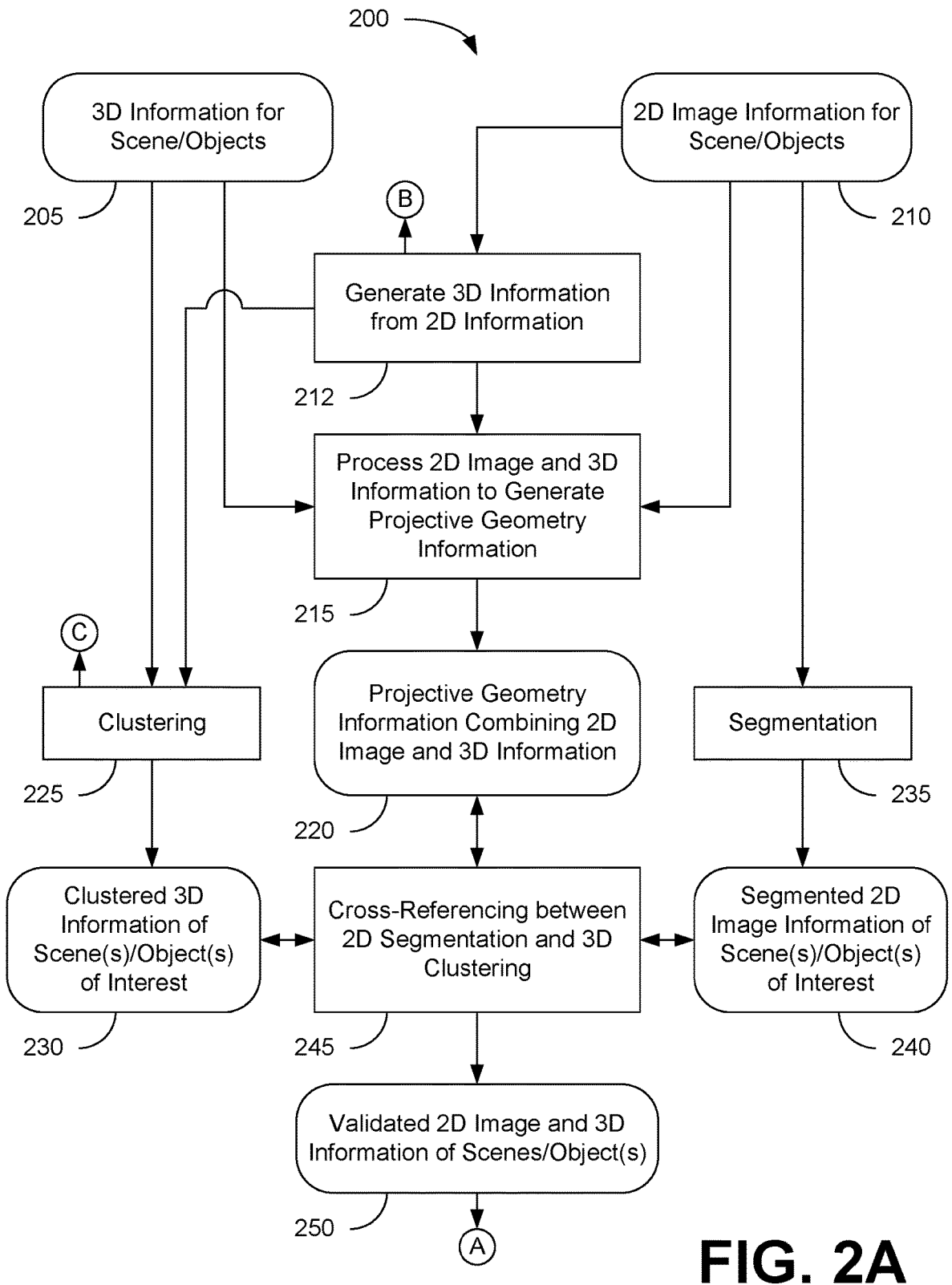
Figure 2B:
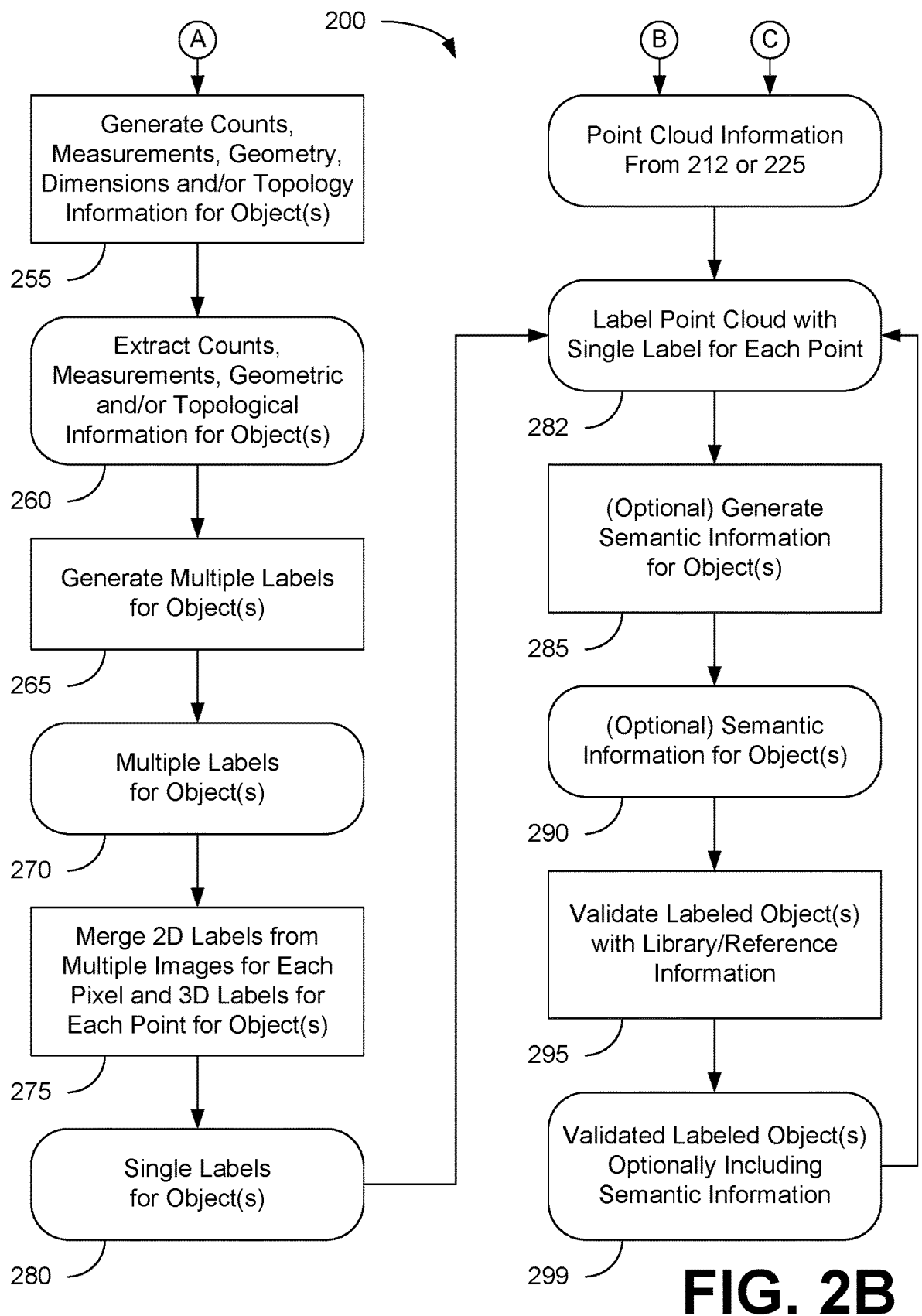

Referring next to FIGS. 2A and 2B, a flowchart illustrating an example of the process 200 is provided. Referring to 205 in FIG. 2A, 3D information is provided, wherein the 3D information comprises information of a scene that includes all or part of the one or more objects of interest. As discussed above, the 3D information can comprise a plurality of point clouds, wireframes, or other sources of 3D information. In 210, 2D image information is provided, wherein the 2D image information can comprise a plurality of 2D images of a scene, wherein the scene includes all or part of the one or more objects of interest. In some aspects, the 2D image information is generated from one or more passive image capture devices and, in a separate aspect, either or both of the image capture device(s) and/or the object(s) may be moving within the scene. As noted previously, the 2D images are overlapping and can be derived from video.

If the 3D information is not provided in 205 it can be generated from the 2D information 210 as long as that information fits the criteria necessary to generate a point cloud from images through 212. In 215, the 3D information and 2D image information is processed to generate projective geometry information that combines the 3D information and 2D image information in 220.

The 3D information is clustered in 225 to provide clustered 3D information of the one or more objects in the scene in 230. The 2D image information is segmented/abstracted in 235 so as to generate segmented 2D image information of the one or more objects in the scene in 240.

The segmented/abstracted 2D image information including the one or more objects 240, the 3D information including all or part of the one or more objects of interest 230, and the combined 2D/3D information including the one or more objects of interest 220 are processed in a plurality of cross-referencing steps in 245 until a consensus about the one or more objects is reached, whereupon the cross-reference generates a set of validated 2D image information and 3D information about the one or more objects in 250.

The validated 2D and 3D information about the one or more objects can now be processed in an object recognition engine, as illustrated by 255-280 in FIG. 2B, to determine their location in both 3D and 2D scene representations. At 255, generate one or more of a general count of the object(s) or count of specific objects, once predictions are made and measurements of the object(s) geometric properties and, if there are two or more objects recognized in the scene, topology information about the relative placement of the objects in the scene and as to each other. Such count, measurements, dimensions, geometries, or topology information can be extracted in 260.

The information from 260 can be processed with machine learning algorithms in 265 to generate multiple labels 270 for the one or more objects of interest, where such multiple labels are associated with probability information. The multiple labels are processed in 275 to merge the multiple labels according to the probability that each of the generated multiple label is accurate as to the recognized object in the scene that is associated with the label so as to generate a single label for each object(s) in 280 in both 3D and 2D space and combination thereof.

The multiple labels that come from the machine learning algorithms applied to the 2D and/or 3D feature vectors are combined into a single label for an object. This combination may be done in a multitude of ways for example taking the most confident prediction, taking an average prediction, applying an additional machine learning algorithm to apply weights to each prediction, etc.

In 282, the single labels generated in 280 are then reapplied back to the original point cloud information, which can come from either step 212 or 225 depending the original information. Each and every point in the point cloud will now have a label applied to it.

In 285, which can be optional, semantic information can be generated for the labeled objects, where the semantic information can be generated from a library of semantic information associated with the relevant object libraries. One or more labeled objects can be provided with semantic information in 290.

The one or more objects of interest having labels and, optionally, semantic information associated therewith can be further processed in 295 to improve the measurement, dimension, and topography information. In this regard, the measurements, dimensions, geometries, and topography information can be compared with a reference object and/or verified information derived from an object library (such as by providing known size information for the object as matched with pertinent information in the object library) so as to provide validated/verified labeled information 299.

If the semantic information is not in agreement with the prediction information, another prediction can be made taking in account additional semantic information in order to provide a more accurate classification of the object. While the flowchart of FIGS. 2A and 2B illustrates a specific order, alternate implementations are included within the scope of the present disclosure in which the depicted steps or elements 205-299 may be executed out of order from that shown or discussed, including substantially concurrently or in a different or reverse order, depending on the functionality involved, as would be understood by those reasonably skilled in the art of the present disclosure.

In some aspects, the methods of the present disclosure are suitable for use, and are performed, "in the cloud" (i.e., the software executes on server computers connected to the internet and leased on an as-needed basis). (Note that the word "cloud" as used in the terms "point cloud" described as part of the disclosure is independent of, and unrelated to, "cloud computing" as such.) As would recognized, cloud computing has emerged as one optimization of traditional data processing methodologies. A computing cloud is defined as a set of resources (e.g., processing, storage, or other resources) available through a network that can serve at least some traditional datacenter functions for an enterprise. A computing cloud often involves a layer of abstraction such that the applications and users of the computing cloud may not know the specific hardware that the applications are running on, where the hardware is located, and so forth. This allows the computing cloud operator some additional freedom in terms of implementing resources into and out of service, maintenance, and so on. Computing clouds may include public computing clouds, such as Microsoft® Azure, Amazon® Web Services, and others, as well as private computing clouds.

Figure 3:
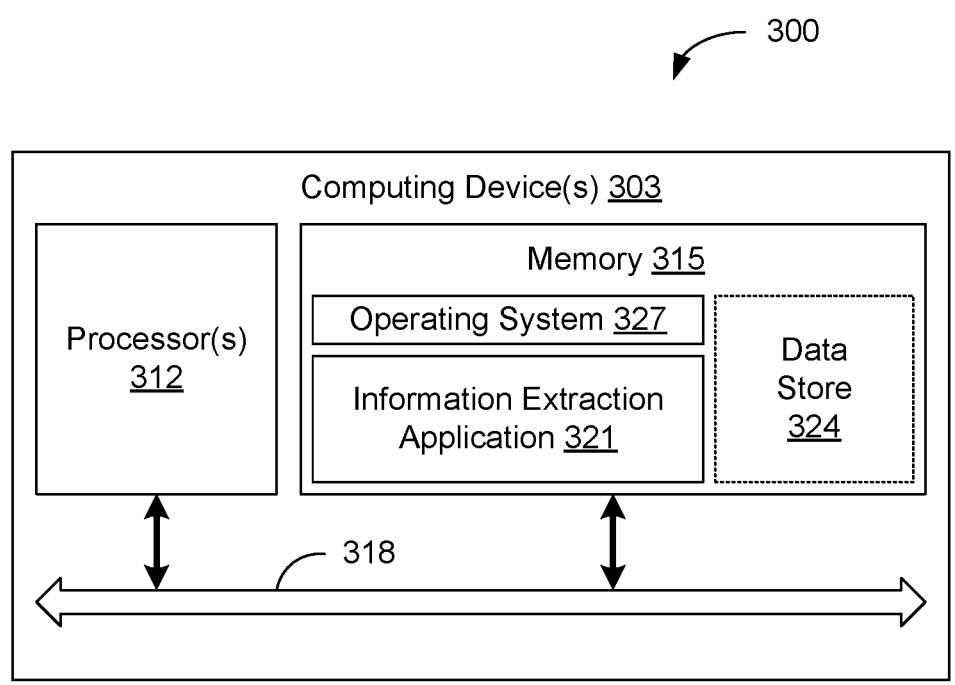
FIG. 3 illustrates an example of a machine that may be utilized for the information extraction methodology disclosed herein.

Referring now to FIG. 3, shown is an example of an example of a machine 300 that may be utilized for the information extraction methodology disclosed herein. The machine 300 can be a computing device 303 or other processing device, which includes at least one processor circuit, for example, having a processor 312 and a memory 315, both of which are coupled to a local interface 318. To this end, the computing device(s) 303 may comprise, for example, a server computer, mobile computing device (e.g., laptop, tablet, smart phone, etc.) or any other system providing computing capability. The computing device(s) 303 may include, for example, one or more display devices and various peripheral devices. Even though the computing device 303 is referred to in the singular, it is understood that a plurality of computing devices 303 may be employed in the various arrangements as described above. The local interface 318 may comprise, for example, a data bus with an accompanying address/control bus or other bus structure as can be appreciated.

Stored in the memory 315 are both data and several components that are executable by the processor 312. In particular, stored in the memory 315 and executable by the processor 312 include an information extraction application 321 and potentially other applications. Also stored in the memory 315 may be a data store 324 and other data. The data stored in the data store 324, for example, is associated with the operation of the various applications and/or functional entities described below. For example, the data store may include databases, object libraries, and other data or information as can be understood. In addition, an operating system 327 may be stored in the memory 315 and executable by the processor 312. The data store 324 may be located in a single computing device or may be dispersed among many different devices. The components executed on the computing device 303 include, for example, the information extraction application 318 and other systems, applications, services, processes, engines, or functionality not discussed in detail herein. It is understood that there may be other applications that are stored in the memory 315 and are executable by the processor 312 as can be appreciated. Where any component discussed herein is implemented in the form of software, any one of a number of programming languages may be employed.

A number of software components are stored in the memory 315 and are executable by the processor 312. In this respect, the term "executable" means a program file that is in a form that can ultimately be run by the processor 312. Examples of executable programs may be, for example, a compiled program that can be translated into machine instructions in a format that can be loaded into a random access portion of the memory 315 and run by the processor 312, source code that may be expressed in proper format such as object code that is capable of being loaded into a random access portion of the memory 315 and executed by the processor 312, or source code that may be interpreted by another executable program to generate instructions in a random access portion of the memory 315 to be executed by the processor 312, etc. An executable program may be stored in any portion or component of the memory 315 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Also, the processor 312 may represent multiple processors 312 and the memory 315 may represent multiple memories 315 that operate in parallel processing circuits, respectively. In such a case, the local interface 318 may be an appropriate network that facilitates communication between any two of the multiple processors 312, between any processor 312 and any of the memories 315, or between any two of the memories 315, etc. The local interface 318 may comprise additional systems designed to coordinate this communication, including, for example, performing load balancing. The processor 312 may be of electrical or of some other available construction.

Although the information extraction application 321, and other various systems described herein, may be embodied in software or instructions executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

Any logic or application described herein, including the information extraction application 321, that comprises software or instructions can be embodied in any non-transitory computer-readable medium for use by or in connection with an instruction execution system such as, for example, a processor 312 in a computer system or other system. In this sense, the logic may comprise, for example, statements including instructions and declarations that can be fetched from the computer-readable medium and executed by the instruction execution system. The flowcharts of FIGS. 1 and 2A-2B show examples of the architecture, functionality, and operation of possible implementations of an information extraction application. In this regard, each block can represent a module, segment, or portion of code, which comprises one or more executable instructions for implementing the specified logical function(s). It should also be noted that in some alternative implementations, the functions noted in the blocks may occur out of the order noted in FIGS. 1 and 2A-2B. For example, two blocks shown in succession in FIGS. 1 and 2A-2B may in fact be executed substantially concurrently or the blocks may sometimes be executed in a different or reverse order, depending upon the functionality involved. Alternate implementations are included within the scope of the preferred embodiment of the present disclosure in which functions may be executed out of order from that shown or discussed, including substantially concurrently or in reverse order, depending on the functionality involved, as would be understood by those reasonably skilled in the art of the present disclosure.

Communication media appropriate for use in or with the methodology of the present disclosure may be exemplified by computer-readable instructions, data structures, program modules, or other data stored on non-transient computer-readable media, and may include any information-delivery media. The instructions and data structures stored on the non-transient computer-readable media may be transmitted as a modulated data signal to the computer or server on which the computer-implemented methods of the present disclosure are executed. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term "computer-readable media" as used herein may include both local non-transient storage media and remote non-transient storage media connected to the information processors using communication media such as the internet. Non-transient computer-readable media do not include mere signals or modulated carrier waves, but include the storage media that form the source for such signals.

In the context of the present disclosure, a "computer-readable medium" can be any medium that can contain, store, or maintain the logic or application described herein for use by or in connection with the instruction execution system. The computer-readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

At this time, there is little distinction left between hardware and software implementations of aspects of systems; the use of hardware or software is generally (but not always, in that in certain contexts the choice between hardware and software can become significant) a design choice representing cost vs. efficiency tradeoffs. There are various information-processing vehicles by which processes and/or systems and/or other technologies described herein may be implemented, e.g., hardware, software, and/or firmware, and that the preferred vehicle may vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various aspects of the devices and/or processes for system configuration via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the aspects disclosed herein, in whole or in part, can be equivalently implemented in integrated circuits, as one or more computer programs running on one or more computers, e.g., as one or more programs running on one or more computer systems, as one or more programs running on one or more processors, e.g., as one or more programs running on one or more microprocessors, as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal-bearing medium include, but are not limited to, the following: a recordable type medium such as a floppy disk, a hard disk drive, a CD, a DVD, a digital tape, a computer memory, etc.; and a remote non-transitory storage medium accessed using a transmission type medium such as a digital and/or an analog communication medium (e.g., a fiber optic cable, a waveguide, a wired communications link, a wireless communication link, etc.), for example a server accessed via the internet.

Those skilled in the art will recognize that it is common within the art to describe devices and/or processes in the fashion set forth herein, and thereafter use engineering practices to integrate such described devices and/or processes into data-processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors, e.g., feedback for sensing position and/or velocity; control motors for moving and/or adjusting components and/or quantities. A typical data processing system may be implemented utilizing any suitable commercially available components, such as those typically found in data computing/communication and/or network computing/communication systems.

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

In one embodiment, among others, a method of generating information about one or more objects of interest in a scene comprises providing a plurality of overlapping 2D images of a scene; selecting an object from the scene, thereby providing a selected object of interest; generating 2D image information from the plurality of overlapping 2D images of the scene, thereby providing 2D image information incorporating all or part of the selected object; providing, by a computer, 3D information generated from the scene, thereby providing 3D information that incorporates all or part the selected object; generating projective geometry information by combining at least some of the 2D image information incorporating all or part of the selected object and at least some of the 3D information incorporating all or part of the selected object, thereby establishing a plurality of relationships between 3D data points derived from either or both of the 2D image information incorporating all or part of the selected object and the 3D image information incorporating all or part of the selected object; and performing a clustering step on the 3D information incorporating all or part of the selected object to partition and group 3D data points present in the 3D information, thereby generating a plurality of clustered 3D information associated with all or part of the selected object. The scene can comprise one or more objects and the plurality of overlapping 2D images can be derived from one or more single passive image capture devices. At least some of the plurality of overlapping 2D images can include all or part of the selected object, and can overlap as to all or part of the selected object. The 3D information from the scene can incorporate information about all or part of the selected object and the 3D data points can be associated with all or part of the selected object. One or more of measurement information, dimensions, and/or geometric information can be derivable for all or part of the selected object.

In one or more aspects of these embodiments, the plurality of relationships can be established by performing an image segmentation/abstraction step on the 2D image information by partitioning and grouping image elements, thereby generating a plurality of segmented 2D image information; performing a clustering step on the 3D information to partition and group 3D data points that belong together, thereby generating a plurality of clustered 3D information; and performing a plurality of cross-validation steps on each of the segmented 2D image information and the clustered 3D information by processing each of the plurality of segmented 2D image information and the plurality of clustered 3D information along with the combined 2D image information and the 3D information. At least some of the plurality of segmented 2D image information can include information about at least part of the selected object and at least some of the plurality of clustered 3D information can include information about at least part of the selected object.

In one or more aspects of these embodiments, measurement information can be generated, thereby providing at least one object measured value for the selected object. A label can be generated for the selected object, thereby providing at least one labeled and measured object. Measurement information can be generated for at least part of the selected, wherein the selected object has one or more dimensions of interest; each of the one or more dimensions of interest has an actual measurement value; and each derived measurement value is, independently, within about 5% or less of the actual measurement value for a corresponding dimension on the selected object. The plurality of overlapping 2D images can be generated from at least one single passive image capture device that is moving in the scene. The 3D information can comprise point clouds derived from the plurality of overlapping 2D images of the scene. At least one of the one or more single passive image capture devices can be a video camera. The 3D information can be derived from point clouds generated from one or more of a time of flight imaging device, a structured light imaging device, a stereoscopic camera or a depth camera. The 3D image information can be derived from one or more wireframes.

In one or more aspects of these embodiments, at least two selected objects of interest from the scene can be provided, thereby allowing topology information to be derivable for the at least two selected objects, wherein the topology information defines relationships between all or part of each of the at least two selected objects in a 3D space associated with the at least two selected objects. The topology information can be generated for at least part of the at least two selected objects, wherein each of the at least two selected objects can, independently, comprise one or more points from which a value for a distance between each of the at least two selected objects can be generated; each distance between the one or more points on the at least two selected objects can, independently, have an actual distance value; a distance value for the distance between at least one of the points on each of the at least two selected objects can, independently, be derived; and each derived distance value can, independently, be within about 5% or less of the actual distance value between corresponding points on each of the at least two selected objects.

In one or more aspects of these embodiments, a count of each of the selected object by label or by similarities in the scene can be provided. A label can be generated for the selected object in the scene, thereby providing a labeled object. Semantic information can be generated for the labeled object, thereby providing a labeled object having semantic information associated therewith. In one or more aspects of these embodiments, the method can comprise comparing the labeled object with reference information, wherein the reference information can include known measurement information; and, in response to the comparison, rejecting the labeled object for inclusion in an object library if the reference information indicates that the label associated with the labeled object is incorrect or accepting the labeled object for inclusion into the object library if the reference object indicates that the label associated with the labeled object is correct. The method can further comprise submitting the labeled object for verification to a human reviewer when rejected; and accepting the labeled object for inclusion into the object library in response to an indication by the human reviewer that the label associated with the labeled object is correct.

In another embodiment, a method of generating information about one or more objects of interest in a scene comprises providing 2D image information from a plurality of overlapping 2D images of a scene, thereby providing 2D image information incorporating all or part of the one or more object of interest; providing 3D information generated from the scene, thereby providing 3D information that incorporates all or part the one or more object of interest; generating projective geometry information by combining at least some of the 2D image information incorporating all or part of the one or more object of interest and at least some of the 3D information incorporating all or part of the one or more object of interest, thereby establishing a plurality of relationships between 3D data points derived from either or both of the 2D image information incorporating all or part of the one or more object of interest and 3D image information incorporating all or part of the one or more object of interest; generating clustered 3D information by clustering the 3D information incorporating all or part of the one or more object of interest to partition and group 3D data points present in the 3D information, thereby providing clustered 3D information associated with all or part of the one or more object of interest; generating segmented 2D image information by segmenting the 2D image information incorporating all or part of the one or more object of interest to partition and group image elements, thereby providing segmented 2D image information including information about at least part of the one or more object of interest; and generating validated 2D and 3D image information by iteratively cross-referencing the projective geometry information, the clustered 3D information and the segmented 2D image information, thereby providing validated 2D and 3D image information including information about at least part of the one or more object of interest. At least some of the plurality of overlapping 2D images can include all or part of one or more object of interest and can be overlapping as to all or part of the one or more object of interest. The 3D information from the scene can incorporate information about all or part of the one or more object of interest and the 3D data points can be associated with all or part of the one or more object of interest.

In one or more aspects of these embodiments, the method can comprise labeling at least one object of the one or more object of interest with a single label by merging multiple labels generated from the validated 2D and 3D image information, thereby providing at least one labeled object. The method can comprise validating the at least one labeled object using library/reference information. The method can comprise generating semantic information for one or more of the at least one labeled object. The 3D information can be generated from the 2D image information of the scene.

As described above, the exemplary aspects have been described and illustrated in the drawings and the specification. The exemplary aspects were chosen and described in order to explain certain principles of the invention and their practical application, to thereby enable others skilled in the art to make and utilize various exemplary aspects of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A method of generating information for objects of interest in a scene comprising one or more buildings, the method comprising:
   a. providing, by a computer, two-dimensional (2D) and three-dimensional (3D) object information for one or more objects of interest in a scene, wherein the one or more objects of interest comprise one or more of buildings, roofs, roof areas, or landscape elements;
   b. generating, by the computer, projective geometry information for the one or more objects of interest in the scene by combining at least some of the provided 2D and 3D object information, thereby establishing a plurality of relationships between 3D data derived from either or both of the 2D and 3D object information for the one or more objects of interest in the scene, wherein the plurality of relationships is established by either or both of:
      i. performing a segmentation or abstraction step on the 2D object information by partitioning and grouping image elements, thereby generating segmented 2D information for the one or more objects of interest in the scene; and
      ii. performing a clustering step on each of the 3D object information to partition and group 3D data that belong together, thereby generating clustered 3D information for the one or more objects of interest in the scene;
   c. performing, by the computer, a plurality of cross-validation steps on either or both of the segmented 2D object information and the clustered 3D object information by processing the segmented 2D information and the clustered 3D information with the 2D and 3D object information, thereby providing:
      i. 3D data associated with at least some of the one or more objects of interest in the scene; and
      ii. a plurality of cross-validated 3D information associated with at least some of the one or more objects of interest in the scene; and
   d. generating, by the computer, for at least some of the one or more objects of interest one or more of:
      i. measurement information;
      ii. geometry information;
      iii. topology information; and
      iv. semantic information.

2. The method of claim 1, wherein either or both of the 2D and 3D object information is derived from one or more of: a single passive imaging device, a LIDAR imaging device, a stereographic image imaging device, a structured light imaging device, a laser scanner, a time of flight imaging device, and GPS information combined with imaging information.

3. The method of claim 1, wherein the one or more objects of interest comprises a roof area on a building in the scene and the measurement information is generated for at least part of the roof area.

4. The method of claim 3, wherein the roof area comprises at least one roof plane, and a pitch measurement is provided for the at least one roof plane.

5. The method of claim 3, wherein the roof area comprises a plurality of roof planes, and wherein the geometry and topology information are generated, thereby providing either or both of:
   a. a georeferenced location or georeferenced orientation of at least some of the plurality of roof planes; and
   b. an orientation of at least one of the plurality of roof planes relative to at least one other roof plane.

6. The method of claim 3, wherein:
   a. the roof area comprises at least one roof element of interest; and
   b. the method further comprises a roof element identification step, thereby providing a label for the at least one roof element of interest.

7. The method of claim 1, wherein:
   a. the one or more objects of interest comprise the roof area and the roof area comprises at least one roof element of interest; and
   b. the geometry and topology information are generated for the roof area and the at least one roof element of interest, thereby providing information about either or both of:
      i. a georeferenced location or georeferenced orientation of the roof area and the at least one roof element of interest; and
      ii. an orientation for the roof area relative to the at least one roof element of interest.

8. The method of claim 1, wherein:
   a. the one or more objects of interest comprise a roof area and a landscape element; and
   b. the geometry and topology information are generated for both the roof area and the landscape element, thereby providing information about either or both of:
      i. a georeferenced location or georeferenced orientation of the roof area and the at least one landscape element; and
      ii. an orientation for the roof area relative to the at least one landscape element.

9. The method of claim 1, wherein the 3D object information further includes the latitude, longitude, and altitude information for one or more of the one or more objects of interest in the scene.

10. A method of generating an information set for obtaining information for a roof area of interest comprising:
    a. providing, by a computer, two-dimensional ("2D") and three-dimensional ("3D") information for a roof area of interest, wherein the roof area of interest is associated with a building in a scene;
    b. generating, by the computer, projective geometry information by combining at least some of the 2D and 3D roof area information, thereby establishing a plurality of relationships between 3D data derived from either or both of the 2D and 3D roof area information, wherein the plurality of relationships is established by either or both of:
       i. performing a segmentation or abstraction step on the 2D roof area information by partitioning and grouping image elements, thereby generating segmented 2D roof area information; and
       ii. performing a clustering step on the 3D roof &ea information to partition and group 3D roof area data that belong together, thereby generating clustered 3D roof area information;
    c. performing, by the computer, a plurality of cross-validation steps on either or both of the segmented 2D roof area information and the clustered 3D roof area information by processing the segmented 2D roof area information and the clustered 3D information with the 2D and 3D roof area information, thereby providing:

i. 3D data associated with the roof area of interest; and
ii. a plurality of cross-validated 3D information associated with the roof area of interest; and
d. generating, by the computer, for the roof area of interest one or more of:
i. measurement information;
ii. geometry information;
iii. topology information; and
iv. semantic information.

11. The method of claim 10, further comprising:
a. providing, by the computer, 2D and 3D information for either or both of the building or scene information;
b. generating, by the computer, projective geometry information by combining at least some of the 2D and 3D building or scene information, thereby establishing a plurality of relationships between 3D data derived from either or both of the 2D and 3D building or scene information, wherein the plurality of relationships is established by either or both of:
i. performing an image segmentation or abstraction step on the 2D building or scene information by partitioning and grouping image elements, thereby generating segmented 2D building or scene image information; and
ii. performing a clustering step on the 3D building or scene information to partition and group 3D building or scene data that belong together, thereby generating clustered 3D building or scene information;
c. performing, by the computer, a plurality of cross-validation steps on either or both of the segmented 2D building or scene image information and the clustered 3D building or scene information by processing the segmented 2D building or scene image information and the clustered 3D information with the 2D and 3D building or scene information, thereby providing:
i. 3D data associated with the building or scene information; and
ii. a plurality of cross-validated 3D information associated with the building or scene information;
d. generating, by the computer, 3D data and the cross-validated 3D information for the building or scene information; and
e. incorporating, by the computer, the generated 3D data and the cross-validated 3D information with the 3D roof area information.

12. The method of claim 11, wherein either or both of the 2D and 3D roof area information is derived from a plurality of overlapping 2D images.

13. The method of claim 11, wherein either or both of the 2D and 3D roof area information is derived from one or more of: a single passive imaging device, a LIDAR imaging device, a stereographic image imaging device, a structured light imaging device, a laser scanner, a time of flight imaging device, and GPS information combined with imaging information.

14. The method of claim 11, wherein the measurement information is generated for at least part of the roof area of interest.

15. The method of claim 11, wherein the roof area of interest comprises at least one roof plane, and a pitch measurement is provided for the at least one roof plane.

16. The method of claim 11, wherein the roof area of interest comprises a plurality of roof planes, and wherein the geometry and topology information are both generated, thereby providing information about either or both of:
a. a georeferenced location or georeferenced orientation of at least some of the plurality of roof planes; and
b. an orientation of at least one of the plurality of roof planes relative to at least one other roof plane.

17. The method of claim 11, wherein the roof area of interest comprises at least one roof element of interest, and wherein the method further comprises a roof element identification step, thereby providing a label for the at least one roof element of interest.

18. The method of claim 11, wherein the roof area of interest comprises at least one roof element of interest, and wherein the geometry and topology information are generated for the roof area of interest and the at least one roof element of interest, thereby providing information about either or both of:
a. a georeferenced location or georeferenced orientation of the roof area of interest and the at least one roof element of interest; and
b. an orientation for the roof area relative to the at least one roof element of interest.

19. The method of claim 12, wherein at least one landscape element is present in the scene, and the method further comprises detection of the at least one landscape element.

20. The method of claim 19, wherein the geometry and topology information are generated for both the roof area of interest and the at least one landscape element, thereby providing information about either or both of:
a. a georeferenced location or georeferenced orientation of the roof area of interest and the at least one landscape element; and
b. an orientation for the roof area of interest relative to the at least one landscape element.

* * * * *